(12) United States Patent
Venkatraman et al.

(10) Patent No.: US 6,505,217 B1
(45) Date of Patent: Jan. 7, 2003

(54) METHOD AND APPARATUS FOR FILE PLACEMENT

(75) Inventors: Sitaram Venkatraman, San Jose, CA (US); Susheel R. Kaushik, Santa Clara, CA (US); Joseph Pereira, Santa Clara, CA (US); Vivek V. Shende, San Jose, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/449,114

(22) Filed: Nov. 24, 1999

Related U.S. Application Data
(60) Provisional application No. 60/109,840, filed on Nov. 25, 1998.

(51) Int. Cl.$^7$ .............................................. G06F 12/00
(52) U.S. Cl. ...................................... 707/205; 711/100
(58) Field of Search ............................. 707/1, 101, 200, 707/205; 711/4, 100, 111, 112; 712/227; 379/230

(56) References Cited

U.S. PATENT DOCUMENTS

| | | | | | |
|---|---|---|---|---|---|
| 4,310,883 A | * | 1/1982 | Clifton et al. | ............... | 707/205 |
| 4,415,969 A | * | 11/1983 | Bayliss et al. | ............... | 712/227 |
| 4,945,475 A | * | 7/1990 | Bruffey et al. | ................. | 707/1 |
| 5,119,291 A | * | 6/1992 | Flannagan et al. | .............. | 711/4 |
| 5,778,392 A | * | 7/1998 | Stockman et al. | .......... | 707/200 |
| 5,832,526 A | * | 11/1998 | Schuyler | ..................... | 707/200 |
| 6,023,744 A | * | 2/2000 | Shoroff et al. | .............. | 707/205 |
| 6,122,362 A | * | 9/2000 | Smith et al. | ................. | 379/230 |
| 6,182,088 B1 | * | 1/2001 | Kawakami et al. | ......... | 707/101 |

OTHER PUBLICATIONS

"Multi–Spindle File–Placement Algorithm", IBM Technical Disclosure Bulletine, Feb. 1986, vol. 28, Issue 9, pp. 4153–4155.*

* cited by examiner

*Primary Examiner*—John E. Breene
*Assistant Examiner*—Khanh Pham
(74) *Attorney, Agent, or Firm*—Oppenheimer, Wolff & Donnelly LLP

(57) ABSTRACT

A file placement process operates to respond to requests for creation of a file, accompanied by file statistics, such as storage space needed by the file, to locate a storage volume having space best fitting the file statistics.

33 Claims, 2 Drawing Sheets

METHOD AND APPARATUS FOR FILE PLACEMENT

This application claims the benefit of provisional application No. 60/109,840, filed Nov. 25, 1998.

COPYRIGHT NOTICE

A portion of the disclosure of this patent document contains material which is subject to copyright protection. The copyright owner has no objection to xerographic reproduction by anyone of the patent document or the patent disclosure in exactly the form it appears in the Patent and Trademark Office patent file or records, but otherwise reserves all copyright rights whatsoever.

REFERENCE TO COMPUTER PROGRAM LISTING APPENDIX

A computer program listing appendix in a file entitled "AppendixA.txt" is submitted with this application on two identical compact discs, one being the primary compact disc and the other being a duplicate thereof, the entire material on which being incorporated herein by reference.

BACKGROUND OF THE INVENTION

One of the many uses of computing systems is the creation and management of very large databases of various types of records. Such databases typically include a processing element coupled to a pool of storage devices ("storage volumes") in the form of disk, tape or even optical storage. And while there may be various processes (e.g., a disk process for storage volumes that are disk) to handle the actual creation of files, it typically has been the user (e.g., application program) who determines the volume on which a file should be created.

Unfortunately, for larger systems, there can often be many users creating files on the available volumes. This, in turn, can result in problems trying to determine on which storage volume the file should be created on. Often, a file will be created on a storage volume with insufficient room, and only later will this fact be discovered when the file is attempted to be written. This will produce an error that will require the user to go through the creation process once again.

Accordingly, an efficient and economical file placement method is needed.

SUMMARY OF THE INVENTION

The present invention is a file placement method that monitors the use of storage volumes (e.g. disk storage) maintained in a pool by a processing system to periodically gather from the storage volumes information concerning space availability. When a file is requested to be created by a user, the request is accompanied by certain file requirements or attributes. Those attributes include a specification of the size of the primary and secondary extents of the file and the maximum number of extents that the file will use. The volume storage information is searched to produce a list of those volumes, having characteristics matching specified file requirements of the file to be created. The storage volume most closely (if not exactly) matching those file attributes will be the one selected the least number of times before file creation. The available space for the selected storage volume is decremented by the size of the primary extent of the file to be created, and a value indicative of the least number of times the volume has been selected is incremented.

The search initially attempts to find a storage volume that can accommodate the entire file and having a fragment sufficiently large to store the larger of the primary or secondary extent of the file to be created. If that search is unsuccessful, the subset of storage volumes is then searched for storage volumes having a fragment that is sufficiently large to store the larger of the requested primary or secondary extents and a predetermined minimum number of extents. Should this search fail, additional searches are made in an effort to find a storage volume that can at least minimally accommodate the file.

In a further embodiment, each storage volume is allotted a random value between one and the number of storage volumes available as the "times selected" value. Then, when a storage volume is selected for a file creation, the times selected value is incremented by a number equal to the number of storage volumes.

These features, as well as additional aspects and advantages of the invention, may be had from a reading of the following detailed description of the invention, which should be taken in conjunction with the accompanying drawings.

DESCRIPTION OF THE SPECIFIC EMBODIMENTS

Figure 1:
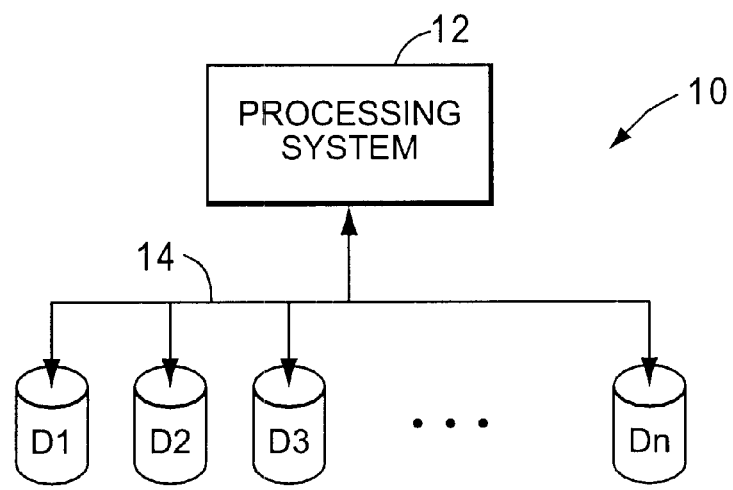
FIG. 1 is a representative view of a computing system for implementing the present invention.

Referring now to the figures, and in particular FIG. 1, there is shown a processing complex designated generally with the reference numeral 10. The processing complex includes a processing system 12 coupled to a plurality of storage volumes, here represented as disk storage devices D1, D2, . . . , Dn, by a communication network 14. The processing complex 10 may take the form of a multiple processor system as taught by U.S. Pat. No. 4,328,496, which includes a plurality of processors coupled together by an interprocessor bus arrangement that is separate from the input/output bus structure that connects the plurality of processors to the storage volumes D1, D2, . . . Alternatively, the processing complex 10 could simply comprise a single processor as the processing system 12, or it could take the form of a cluster of multiprocessors along the lines of that taught by U.S. Pat. No. 5,751,932.

However formed, the processing system 12 is preferably capable of running a number of different processes, including user (application) processes and disk processes. Preferably, there will be a disk process (not shown), for each of the storage volumes D1, D2, . . . , Dn as is conventional;

and, as is also conventional, the storage volumes D are addressed, using the name of the associated disk process.

Figure 2:
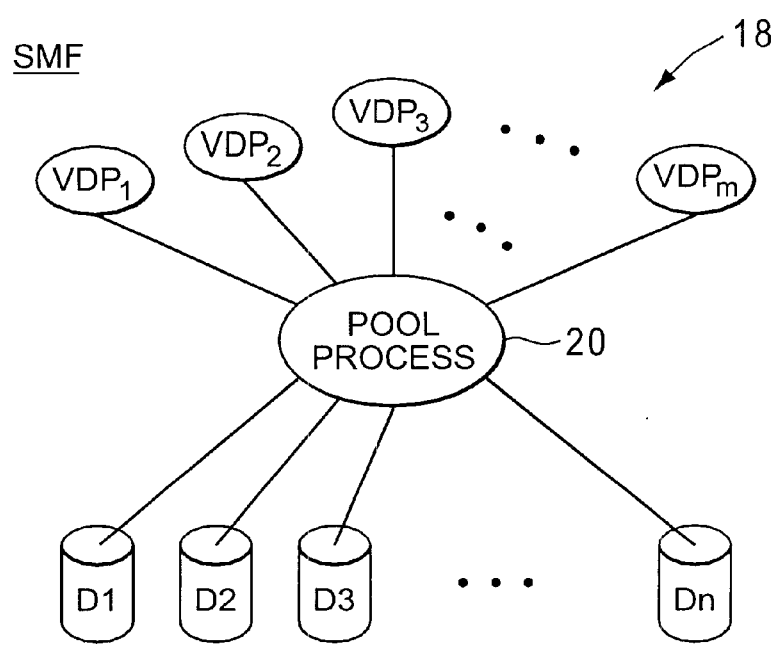
FIG. 2 is a representation of the processes used in implementing the present invention.

The processing system 12, according to the present invention, has running a storage management facility (SMF), illustrated generally in FIG. 2 for managing the storage volumes D1, D2, . . . , Dn. The SMF, designated with the reference numeral 18, includes a number of virtual disk processes (VDP), $VDP_1$, $VDP_2$, . . . , $VDP_m$, that are configured to appear to the user as if they were the storage volumes themselves. Thus, when a user requests a storage volume for creating a file, the VDP will act as if it were that storage volume, but will select a storage volume according to the present invention for creating the file.

As FIG. 2, shows the VDPs communicate with a pool process 20 which, in turn, has communicative access to the storage volumes D1, D2, . . . DN. The pool process 20 is responsible for managing the storage volumes D. As part of this responsibility, the pool process 20 implements a "statistics interval." A statistics interval is the period of times between polls of the storage volumes D by the pool process 20. Each poll will gather statistic information from the storage volumes D. Status information is provided to the pool process 20 by a storage volume D when a change in status occurs. Status information may include such information as to whether the particular storage volume is in an UP state (or has failed since the last poll), or can support the creation and maintenance of an audited file in association with a file creation. Statistics information may include available space, the number of extents and their size, the number and size of fragments, and the like. Preferably, the statistics interval is specified when defining the pool process 20. It is an optional parameter, but if not specified, will default to a predetermined time (e.g., one minute).

The VDPs will have the same statistics interval during which the same information concerning the storage volumes D is requested by, and supplied, to the VDPs by the pool process. If the statistics interval is too large, the decisions made for file placement will be using potentially incorrect data as will be seen below. On the other hand, if the statistics interval is not large enough, it could have performance implications since every statistics update for a pool process will typically result in messages between the pool and every physical volume included in it, and also between the pool and every VDP associated with it.

The two intervals (i.e., that for the pool process 20 and that used by the VDPs) need not necessarily be in synchronism, and it is possible for the pool process to return stale information to the VDPs.

Whenever new statistics are obtained from the pool process 20, the free space information for the volumes is refreshed. Also, in one embodiment of the invention, each VDP maintains a "times related" value for each storage volume D indicative of the times the particular storage volume has recently been selected by that VDP. When the information for the VDPs is refreshed (from that maintained by the pool process 20) the times selected value maintained by each VDP for each storage volume is reset to, for example, zero. This results in every VDP associated with a given pool giving equal priority to every storage volume in the pool for placing files with identical file creation criteria. The effect is a lack of randomness in storage volume selection.

A preferred embodiment of the invention has each VDP generating a random value from 1 to n for each of the storage volumes and using this random value as the times selected value. Each time a storage volume is selected for file creation, the times selected value is incremented by the number of (n) storage volumes. Thus, for example, if there are five storage volumes 1, 2, . . . , 5, they could be randomly assigned the respective random numbers 2, 5, 1, 4, 3. As will be seen, the process for selecting a storage volume for file creation includes selecting that storage volume most closely, if not exactly, meeting the criteria of the file creation request having the lowest times selected value. Thus, if in this example storage volumes 1, 2, 3, and 5 meet the desired criteria, the one with the lowest times selected value, storage volume 3 (with a time selected value of 1) would be selected. Then, after a storage volume is selected for file creation, its associated times selected value is incremented with the value 5—the number of available storage volumes (in this example 5). Thus, after the storage volume 3 is selected for file creation, the associated time selected value is incremented to 6.

Figure 3:
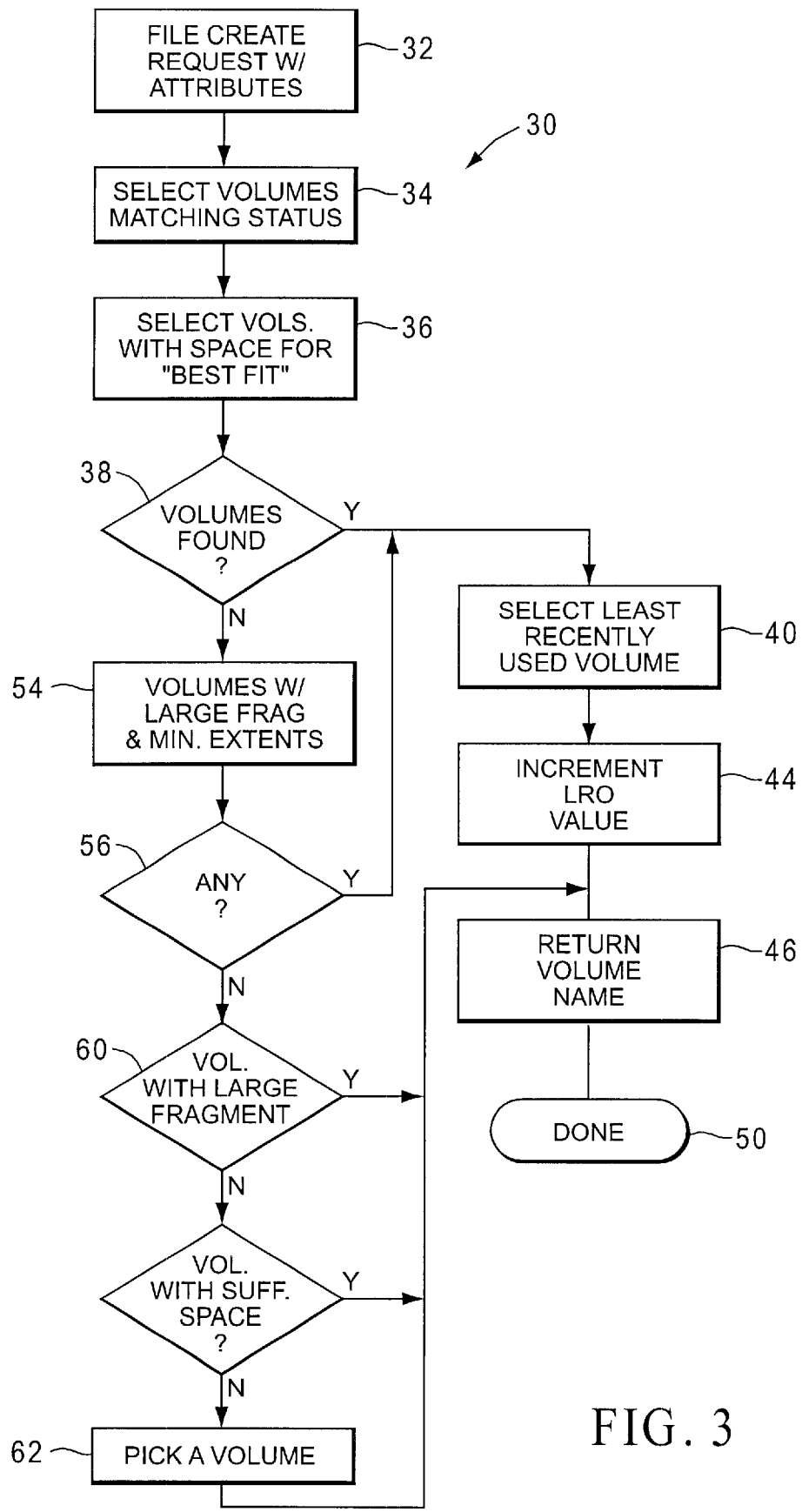
FIG. 3 is an overall diagram illustrating the steps of the method of the present invention for selecting a volume for complying with a file creation request.

Turning now to FIG. 3 there is shown a flow diagram illustrating the procedure, designated generally with the reference numeral 30, containing the major steps used to implement the present invention.

As FIG. 3 shows, the file creation process 30 begins at step 32 when a VDP receives a request for file creation. That request, as explained above, will be accompanied by status and statistic information. The status information may be implicit or express. Implicit information is that the file is to be created on a storage volume D that is up and running. Express status information includes whether or not the storage volume is configured as an audited data volume.

Statistic information concerns the file requested to be created, and includes the sizes of the primary and secondary extents (expressed in the number of pages, each page being 2K bytes), and the maximum extents the file will use.

The file creation attributes (required status and statistic information ) are passed to a placement manager (PM) which is a part of the VDP, along with the status and storage information of the storage volumes D. The PM, at step 34, will first review the information, and prepare a list of all storage volumes having status information matching those of the file creation request. If there is no stroage volume found with status matching that of the file creation request, the VDP will return an error to the user.

Next, at step 36, the PM will find the list of storage volumes D having sufficient free space to accommodate the entire file of the file creation request, and also having a fragment large enough to accommodate the larger of the primary or secondary extents. If storage volumes D meeting the requirements are found, the procedure 30 will leave the selection process of step 38 in favor of step 40 where the one storage volume being least recently selected (i.e., the storage volume having the smallest times selected value) is nominated as the one for the file creation request step 40.

In step 44 the times selected value associated with the storage volume D elected for the file creation is incremented by the number of storage volumes available to the pool process (FIG. 2). At step 46 the identification (volume name)

of the nominated volume storage D is returned to the VDP. The VDP will create a file name on the selected volume, update the file creation request with this file name, and forward the file creation request to the disk process associate with the selected storage volume. The process 30 concludes at step 50.

If, however, in step 38, no storage volumes D were found to accommodate the entire file, or no storage volume had a fragment sufficiently large to accommodate the larger of the primary or secondary extents, process 30 will next, at step 54, search through the storage volume information for each of the storage volumes of the list to determine if any have (1) a fragment sufficient to accommodate the largest of the primary or the secondary extent of the file creation request, and a minimum number of extents. Here the minimum number is determined by the number of extents contained in the file creation request. If the file creation request specifies a file possibly containing more than sixteen extents, the minimum number used for step 54 is sixteen. If the file creation request identifies a maximum number of extents of sixteen or less, the minimum number of extents used in step 54 is one.

If, in step 56, one or more volumes matching the criteria tested in step 54 is found, step 56 will be exited in favor of steps 40 and 44 where the storage volume having the lowest times selected value will be selected, and the times selected value incremented (again, by the number of storage volumes (n) available to the process pool 20). The identification of the selected storage volume is then used for the file name that updates the file creation request which is forwarded to disk process of the selected storage volume, as described above. Then the process 30 exits at step 50.

If, on the other hand, no storage volume D is found having a fragment large enough to accommodate the larger of the primary or secondary extents, or to accommodate the minimum extents, as described above, step 56 will then be exited in favor of step 60 where the product of the largest fragment and the cumulative free space on the storage volume is calculated for each of them. The storage volume having the largest such product is selected (step 62), this time without regard to the times selected value, and the process 30 then returns the identification of the selected storage volume to the VDP and ultimately the user in step 46. Again, and the process exits at step 50.

Finally, if no storage volume can be found matching the required criteria tested for in steps 32–38 and 54–62, the PM will merely pick a volume from the list, and return the identification of the picked storage volume to the VDP and user.

If it later turns out that the selected storage volume does not contain sufficient room for the file, when that file is first written an error will be returned to the user, causing it to again attempt a file creation in the hopes that circumstances have changed (e.g., the addition of more storage volumes under control of the pool process 20, or room can now be found on the available storage volumes (D) so that the file can be created on one of the storage volumes D having sufficient room.

Therefore, one implementation of the foregoing method includes a routine to actually select a volume. The routine requires an initialized heap from which to allocate a temporary working area while a volume is being selected. From among the volumes in the pool, the set of volumes to consider is first limited by user specified criteria. From that list the selection routine will choose a volume which is one of the volumes with the best statistics. Once, the candidate storage volumes to be considered are chosen, the other volumes are filtered out from a consideration array or subset. In this implementation, the selection criteria are translated into bit fields (the criteria determines which bits are asserted). A corresponding set of bit fields is provided with each volume in the pool. A bit field mask is used to indicate which bits of the bit field should be matched in the comparison. By default, non-isolated, non-quarantined volumes in the up state are considered. However, a caller may override this with selection criteria if desired. The translated selection criteria is applied to each of the volumes under consideration by performing a bit-wise Exclusive OR (XOR) between the selection criteria bit field and the corresponding volume's bit field to determine the bits in which they differ. Then, a bitwise AND between the XOR result and the appropriate bit mask is performed to determine which differences are important. Next if that volume can accommodate the primary extent of the file being it is noted in a scratch array. This is repeated for each volume in the array of volumes to be considered.

Once all the volumes have been traversed, the scratch array is scanned to select a volume based on selection factors as follows: (1) check whether or not the volume has enough space to accommodate the entire file and that its largest extent is greater than or equal to the size of the larger of the file's primary and secondary extent; and among volumes that match this criteria, check whether this volume has been selected the least number of times; (2) check whether or not the volume has met the previous criteria, and if not, check whether or not it can accommodate the file with a minimum number of extents; and among volumes that match the above criteria, check whether this volume has been selected the least number of times; (3) check whether or not the volume has met the previous two criteria, and if not, choose a volume that has the biggest extent from amongst all volumes whose largest extent is greater than or equal to required extent size; (4) check whether or not the volume has met the previous three criteria, and if not, choose a volume that has the largest product of free space and biggest extent. Once the scratch array of volumes is fully traversed, the best match is determined for the criteria in the order specified.

In the present invention, as described above, the process of selecting a volume for file placement is quite efficient. The method of the present invention makes only one pass through the entire list of volumes, performing all the checks in that one pass. Also, any time it finds a volume that matches a higher order criterion, the invention method will not attempt to apply the lower order criteria to any of the remaining volumes in the subset of possible candidates.

An advantage of the present invention is that it offers a fairly reasonable solution to the problem of fragmented disks.

Attached, as an Appendix, in the C programming language, is an example of how to implement the present invention.

APPENDIX A

```
/* pmsel.c */
#ifdef __TANDEM
#endif
/*
 *****************************************************************************
 *
 * ##PMSel (Volume Selection Module) -- Select a volume for a placement
 *                        manager.
 * ##
 *
 * @@@ START COPYRIGHT @@@
 * Tandem Confidential: Need to Know Only
 * Copyright (c) 1995, Tandem Computers, Incorporated
 * Protected as an unpublished work.
 * All Rights Reserved.
 *
 * The computer program listings, specifications, and documentation
 * herein are the property of Tandem Computers Incorporated and shall
 * not be reproduced, copied, disclosed, or used in whole or part
 * for any reason without the prior express written permission of
 * Tandem Computers Incorporated.
 * @@@ END COPYRIGHT @@@
 *
 * DESCRIPTION
 *
 * This module will select a volume from a volume list prepared by the PMComm
 * module. The selection of the volume will be based on one or more criteria
 * specified by the caller.
 *
 * File created: Mon Aug 7 10:07:06 1995
 * Author:     Sitaram Venkatraman
 *
 *****************************************************************************
 */
/*
 * #include directives needed by all modules
 */
#ifdef __TANDEM
#else
#endif
/*
 * #include directives needed by this module
 */
#include "shsun.h"
#include <stdlib.h>  nolist    /* TOOLS */
#include <stddef.h>  nolist    /* TOOLS */
#include <memory.h>  nolist    /* TOOLS */
#include <string.h>  nolist    /* TOOLS */
#include <stdio.h>   nolist    /* TOOLS */
#include <limits.h>  nolist    /* TOOLS */
#include <tal.h>     nolist    /* TOOLS */
#include "tdmfeno.h" nolist    /* S7050 */
#include "tdext.h"   nolist    /* S7050 */
#include "machine.h" nolist    /* S7050 */
```

A-1

```c
#include "shfenoe.h" nolist    /* S7050 */
#include "shcomne.h" nolist    /* S7050 */
#include "shheape.h" nolist    /* S7050 */
#include "shasrte.h" nolist    /* S7050 */
#include "llist.h"   nolist    /* S7050 */
#include "shllst.h"  nolist    /* S7050 */
#include "shmeme.h"  nolist    /* S7050 */
#include "pmcomme.h" nolist    /* T8467*/
#ifdef __TANDEM
#include <CEXTDECS (ABEND,           \
           DEBUG,                    \
           JULIANTIMESTAMP)> NOLIST
#endif
#ifndef __TANDEM
#pragma section debug
_tal void DEBUG (
   void);
#endif
/*
 * Design notes:
 *
 * The design of this module has been thoroughly documented in document #P2502nn
 * in SMSLIB.
 *
 *
 */
/*
 * Module private defines.
 */
#define PMSEL_MINCANDIDATES 1   /*
                     * This value represents the minimum
                     * number of volumes to be considered
                     * when selecting a volume. The set
                     * of volumes to consider is first
                     * limited by user specified
                     * criteria. From that list, the
                     * selection routine will choose a
                     * volume from the set of volumes
                     * with the best
                     * statistics. PMSEL_MINCANDIDATES
                     * determines the minimum size of
                     * that set.
                     */
#define PMSEL_FREEPAGES_SCALAR  1 /*
                     * Value used to scale the freepages
                     * criteria specified in the input to
                     * PMSEL_SelectVol.
                     */
#define PMSEL_SCRATCHARRAYENTRY_EYECATCHER "SAE"
#define PMSEL_SUBSETLINKELEMENT_EYECATCHER "SLE"
#define PMSEL_SUBSETDESC_EYECATCHER        "SDE"
#define PMSEL_ARRAYFUDGEFACTOR             1.5
/*
 * BEGIN SCAFFOLDING
 */
#define PMCOMM_VOLDESC_EYECATCHER "VDE"
```

```
/*
 * END SCAFFOLDING
 */
/*
 * Module private typedefs.
 */
#pragma PAGE "PMSel: PMSel_JulianTimestampStruct -- SMS_Int16 redefinition of 64-bit timestamp."
/**************************************************************************
 *
 * PMSel_JulianTimestampStruct --
 *
 * DESCRIPTION
 *
 * This struct allows for the access of individual 16-bit words from a
 * 64-bit timestamp.
 *
 *
 * Created: Wed Aug 16 10:26:24 1995
 * Author:  Sitaram Venkatraman
 **************************************************************************
 */
typedef struct PMSel_JulianTimestampStruct
{
  long Word1:16;
  long Word2:16;
  long     :0;        /*
                       * This bit field with a length of zero is used as
                       * a seperator between two consecutive bit field
                       * definitions. By doing so, we are defining
                       * Word1-Word2 in one long, and Word3-Word4 in
                       * another long. We have to do like this since we
                       * cannot define bit fields using 'long long' or
                       * 'double'.
                       */
  long Word3:16;
  long Word4:16;
              /*
               * The last 16 bits of the 64-bit
               * timestamp. This number is used as the
               * seed during a random number generation.
               */
} PMSel_JulianTimestampStruct;
#pragma PAGE "PMSel: PMSel_JulianTimestampUnion -- SMS_Int16 redefinition of 64-bit timestamp."
/**************************************************************************
 *
 * PMSel_JulianTimestampUnion --
 *
 * DESCRIPTION
 *
 * This union allows for the access of individual 16-bit words from a
 * 64-bit timestamp.
 *
 *
 * Created: Wed Aug 16 10:26:24 1995
 * Author:  Sitaram Venkatraman
 **************************************************************************
```

A-3

```
*/
typedef union PMSel_JulianTimestampUnion
{
  long long LongLongField;
                /*
                         * 64-bit field that will be used to
                         * hold the timestamp obtained by
                         * invoking the JULIANTIMESTAMP
                         * procedure.
                         */
  PMSel_JulianTimestampStruct WordOneToFour;
                /*
                         * 16-bit access to a 64-bit field. This is only
                         * being used by the random number generator.
                         */
} PMSel_JulianTimestampUnion;
#pragma PAGE "PMSel: PMSel_SubsetDescStruct -- Subset Description structure."
/****************************************************************************
 *
 * PMSel_SubsetDescStruct --
 *
 * DESCRIPTION
 *
 * This structure is used to describe a subset of volumes in the
 * pool. It can be used to either include or exclude volumes from
 * being considered during volume selection. The actual subset is
 * stored as a linked list of PMSel_VolIDStructs.
 *
 *
 * Created: Mon Aug  7 16:38:13 1995
 * Author:  Sitaram Venkatraman
 ****************************************************************************
 */
typedef struct PMSel_SubsetDescStruct
{
  SMS_EyeCatcherType eyeCatcher;
                /* Eye catcher for debugging purposes.
                 */
  SMS_Addr32 heapToUse;
                /* Heap from which subset elements
                 * should be allocated.
                 */
  SMS_Int16 subsetType;
                /* Type of subset:
                 * PMSEL_EXCLUDESUBSET or
                 * PMSEL_INCLUDESUBSET.
                 */
  LListHeader_Struct subsetListHeader;
                /* Header of the volume subset linked
                 * list.
                 */
  SMS_Int16 subsetSize;
                /* Number of volumes in the subset.
                 * This can also be obtained by calling
                 * the function LList_Len and passing it
                 * a pointer to the list header.
```

```
                */
} PMSel_SubsetDescStruct;
#pragma PAGE "PMSel: PMSel_ScratchArrayEntryStruct -- Volume scratch array structure."
/*****************************************************************************
*
* PMSel_ScratchArrayEntryStruct --
*
* DESCRIPTION
*
* This structure defines an entry in the scratch array, which keeps
* track of the list of volumes under consideration during volume
* selection.
*
*
* Created: Mon Aug  7 17:22:35 1995
* Author: Sitaram Venkatraman
******************************************************************************
*/
typedef struct PMSel_ScratchArrayEntryStruct
{
  SMS_EyeCatcherType eyeCatcher;
                /*
                 * Eye catcher for debugging purposes.
                 */
  SMS_Int16 volInfoIndex;
                /* Index into volDesc->volInfoArray.
                 */
  SMS_Int16 volStatsIndex;
                /* Index into volDesc->volStatsArray.
                 */
  SMS_Byte volPrimaryCpu;
                /*
                 * Primary cpu of that volume.
                 */
  SMS_Int32 pagesFree;
                /*
                 * Free Space in the volume
                 */
  SMS_Int32 timesSelected;
                /* Number of times volume has
                 * been selected
                 * since last update.
                 */
  SMS_Int32 volCapacity_l;
                /*
                 * Capacity of the volume.
                 */
  SMS_Int32 largestVolFragment_l;
                /*
                 * Size of the largest vol.
                 */
} PMSel_ScratchArrayEntryStruct;
/* Begin Exported Data */
#ifndef _PMSEL
#define _PMSEL
/*
```

```
/***************************************************************************
 * ##PMSel (Volume Selection Module) -- Select a volume for a placement manager. ##
 *
 * @@@ START COPYRIGHT @@@
 * Tandem Confidential: Need to Know Only
 * Copyright (c) 1995, Tandem Computers, Incorporated
 * Protected as an unpublished work.
 * All Rights Reserved.
 *
 * The computer program listings, specifications, and documentation
 * herein are the property of Tandem Computers Incorporated and shall
 * not be reproduced, copied, disclosed, or used in whole or part
 * for any reason without the prior express written permission of
 * Tandem Computers Incorporated.
 * @@@ END COPYRIGHT @@@
 *
 ***************************************************************************
 */
/*
 * Exported data.
 */
#pragma PAGE "PMSel: PMSel_SelCriteriaEnumDefs -- Selection criteria enums."
/***************************************************************************
 *
 * PMSel_SelCriteriaEnumDefs --
 *
 * DESCRIPTION
 *
 * The following enums are used as identifiers for selection
 * criteria. They are used as possible values for the criteriumID of a
 * PMSel_SelCriteriumStruct.
 * Everytime a new criteria is added for which a bit field and a mask
 * needs to be set, a new case statement needs to be added in the
 * function PMSel_ConstructStatConfigInfo.
 *
 * Created: Mon Aug  7 16:16:55 1995
 * Author:  Sitaram Venkatraman
 ***************************************************************************
 */
typedef enum PMSel_SelCriteriaEnumDefs
{
  PMSEL_FIRSTSELCRITERIA_ENUM  = 0,
  PMSEL_TMFCONFIGURED,
  PMSEL_AUDITED,
  PMSEL_MIRRORCONFIGURED,
  PMSEL_MIRRORED,
  PMSEL_ISOLATED,
  PMSEL_QUARANTINED,
  PMSEL_AVAILABLE,
  PMSEL_PRIMARYCPU,
  PMSEL_SIZE_PRIMARY_EXTENT,
  PMSEL_SIZE_SECONDARY_EXTENT,
  PMSEL_NUM_MAXEXTENTS,
  PMSEL_LASTSELCRITERIA_ENUM
} PMSel_SelCriteriaEnumDefs;
/*
```

```
 * Maximum criteria that can be selected. This number should be changed
 * depending on whether enums are added or deleted from
 * PMSel_SelCriteriaEnumDefs. This define is set to the number of enums in the
 * above definition.
 */
#define PMSEL_MAXCRITERIA  (PMSEL_LASTSELCRITERIA_ENUM - 1)
/*
 * Default values for volume IDs.
 * These values are used as default values for volIDs, when a volume's
 * ID is unknown or invalid.
 */
#define PMSEL_VOLNOTINPOOL  -3
#define PMSEL_VOLIDINVALID  -2
#define PMSEL_VOLIDUNKNOWN  -1
/*
 * Defines for Subset Types.
 * Volume selection may be limited to a subset of volumes by passing a
 * subset of volumes to the volume selection routine. This subset may
 * designate a list of volumes to either be included or excluded from
 * consideration. The following two #defines are used to define which
 * way a subset should be used.
 */
#define PMSEL_EXCLUDESUBSET  0
#define PMSEL_INCLUDESUBSET  1
#pragma PAGE "PMSel: PMSel_SelCriteriumStruct -- Selection criterium structure."
/**************************************************************************
 *
 * PMSel_SelCriteriumStruct --
 *
 * DESCRIPTION
 *
 * This structure is used by a PM when calling PMSel_SelectVol to
 * specify criteria that the selected volume must meet. A PM may pass
 * in an array of these, giving a criterium identifier and a value for
 * each criterium.
 *
 *
 * Created: Mon Aug  7 16:32:50 1995
 * Author:  Sitaram Venkatraman
 **************************************************************************
 */
typedef struct PMSel_SelCriteriumStruct
{
   SMS_Int16 criteriumID;
                /* Criterium identifier.
                 */
   SMS_Addr32 val;
                /* Address of the value that
                 * the criterium should have.
                 */
   SMS_Int16 valLen;
                /* Length of criterium value.
                 */
} PMSel_SelCriteriumStruct;
#pragma PAGE "PMSel: PMSel_VolIDStruct -- Volume ID structure."
/**************************************************************************
```

```
*
* PMSel_VolIDStruct --
*
* DESCRIPTION
*
* This structure is used to uniquely identify a volume in the pool.
*
*
* Created: Mon Aug  7 16:36:15 1995
* Author:  Sitaram Venkatraman
***************************************************************************
*/
typedef struct PMSel_VolIDStruct
{
  SMS_ExtVolumeNameType volName;
                /* Fully qualified name of volume.
                        */
  SMS_Int16 volID;
                /* Identifier for volume.
                        */
} PMSel_VolIDStruct;
#pragma PAGE "PMSel: PMSel_SubsetLinkElementStruct -- Structure of subset link element."
/***************************************************************************
*
* PMSel_SubsetLinkElementStruct --
*
* DESCRIPTION
*
* This is a structure that defines an element in the volume subset
* list.
*
*
* Created: Tue Aug  8 09:14:33 1995
* Author:  Sitaram Venkatraman
***************************************************************************
*/
typedef struct PMSel_SubsetLinkElementStruct
{
  SMS_EyeCatcherType eyeCatcher;
                /*
                        * Eye catcher for debugging purposes.
                        */
  LListElement_Struct subsetLink;
                /*
                        * Link to the previous and next element
                        * in the subset linked list.
                        * Required by the LList module.
                        */
  PMSel_VolIDStruct volIDInfo;
                /*
                        * Volume ID information structure.
                        */
} PMSel_SubsetLinkElementStruct;
/* End Exported Data */
#endif   /* _PMSEL */
/*
```

```
 * Internal include file for prototypes.
 */
#include "pmseli.h"    /* T8467 */
/*
 * Static variables.
 */
/*
 * Macros.
 */
/*
 * Module functions/procedures.
 */
#pragma PAGE "PMSel: PMSel_FindElemInSubset_v -- Search for a given element in the subset list."
/*PRIVATE**********************************************************************
 *
 * PMSel_FindElemInSubset_v --
 *
 * DESCRIPTION
 *
 * This function searches the volume subset list for the element that
 * contains the same volume name as that supplied in the input. A
 * pointer to the element that is found is returned to the caller.
 * If no matching element is found, a NULL pointer is returned.
 *
 * RESULTS
 *
 * void.
 *
 * SIDE EFFECTS
 *
 * None.
 *
 * Created: Wed Aug  9 16:39:03 1995
 * Author:  Sitaram Venkatraman
 ******************************************************************************
 */
static
void
PMSel_FindElemInSubset_v
(
    SMS_ExtVolumeNameType* volNamePtr,
                /* IN: REQUIRED
                 * Volume name for which a matching
                 * element has to be found in the subset
                 * list.
                 */
    PMSel_SubsetDescStruct* subsetDescPtr,
                /* IN: REQUIRED
                 * Pointer to the subset descriptor.
                 */
    PMSel_SubsetLinkElementStruct** subsetLinkElemPtrPtr
                /* OUT: REQUIRED
                 * Element in the subset list that
                 * contains the volume name provided in
                 * the input to this function.
                 * A pointer to this element is returned
```

```
                            * to the caller.
                            */
)
{
  PMSel_SubsetLinkElementStruct* lSubsetLinkElemPtr = NULL;
  SMS_DebuggingLabel ( ValidateParams );
  /*
   * Verify that subsetDescPtr is not invalid.
   */
  SMS_AssertTruth(! SMSMem_MemAddrIsNull (subsetDescPtr ));
  /*
   * Check that subsetDescPtr has valid values.
   */
  SMS_AssertTruth((memcmp(subsetDescPtr-> eyeCatcher,
              PMSEL_SUBSETDESC_EYECATCHER,
              SMS_MAXEYECATCHERBYTES)) == 0);
  /*
   * Initialize the output parameter.
   */
  lSubsetLinkElemPtr = NULL;
  /*
   * Get the first element of the list if the list is not an empty
   * list. If the list does not contain any elements, return a NULL
   * pointer to the caller.
   */
  if ((subsetDescPtr-> subsetSize) != SMS_ZERO)
  {
    lSubsetLinkElemPtr = LList_FirstElement(&(subsetDescPtr->
                            subsetListHeader),
                            PMSel_SubsetLinkElementStruct,
                            subsetLink);
    /*
     * We tried to retrieve the element only after verifying that
     * the list does contain elements. Hence, we assert that the
     * element is not nil.
     */
    SMS_AssertTruth(!(LList_ElementIsNil(&(subsetDescPtr->
                            subsetListHeader),
                            lSubsetLinkElemPtr,
                            subsetLink)));
  } /* if ((subsetDescPtr-> subsetSize) != SMS_ZERO) */
  else
  {
    /*
     * The output parameter has already been set to NULL. Just
     * return to the caller.
     */
    goto FunctionExit;
  } /* if ((subsetDescPtr-> subsetSize) != SMS_ZERO) else ... */
  /*
   * If we reach here, it means that atleast one element was
   * found. Check whether this element contains a volume name
   * matching the one specified in the input.
   * If not, scan the subset list until a matching element is found
   * or the entire list has been scanned.
   */
```

A-10

```
do
{
  /*
   * First of all, assert that the most recently retrieved link
   * element is valid.
   */
  SMS_AssertTruth((memcmp(lSubsetLinkElemPtr-> eyeCatcher,
              PMSEL_SUBSETLINKELEMENT_EYECATCHER,
              SMS_MAXEYECATCHERBYTES)) == 0);
  /*
   * Check for a matching volume name.
   */
  if (strncmp((char *)&((lSubsetLinkElemPtr-> volIDInfo).volName),
         (char *)volNamePtr,
         sizeof ((lSubsetLinkElemPtr-> volIDInfo).volName) - 1) ==
         SMS_ZERO)
  {
    /*
     * A match has been found. Return a pointer to this link
     * element to the caller.
     */
    *subsetLinkElemPtrPtr = lSubsetLinkElemPtr;
    goto FunctionExit;
  }
  /*
   * Match was not found. Get the next element in the list.
   */
  lSubsetLinkElemPtr = LList_NextElement(lSubsetLinkElemPtr,
                      PMSel_SubsetLinkElementStruct,
                      subsetLink);
  /*
   * End the loop if the element retrieved above is NIL. It means
   * that we have already processed the last element in the list.
   */
} while (!(LList_ElementIsNil(&(subsetDescPtr->
                 subsetListHeader),
                 lSubsetLinkElemPtr,
                 subsetLink)));
/*
 * If we reach here, it means that a matching element was not
 * found. We have already initialized the output parameter to NULL
 * and that is what the caller receives.
 */
SMS_DebuggingLabel ( FunctionExit );
return;
#pragma nowarn(93)
} /* PMSel_FindElemInSubset_v() */
#pragma warn(93)
#pragma PAGE "PMSel: PMSel_ConstructStatConfigInfo_v -- Translate selection criteria"
/*PRIVATE*********************************************************************
*
* PMSel_ConstructStatConfigInfo_v --
*
* DESCRIPTION
*
* This routine is private to the selection module. Its purpose is to
```

A-11

```
 * translate the selection criteria specified by a caller into bit
 * fields that can be compared to bit fields kept for each volume in
 * the pool. For each bit field, a bit field mask is also
 * initialized. The bit field mask is used to indicate which bits of
 * the bit field must match in a comparison.
 * For example,
 * if a user specifies that the volume that is selected must be TMF
 * configured, then the auditedFlagTMF bit of statConfigBooles will be
 * set to 1, and the corresponding bit of the statConfigBoolesMask
 * will be set to 1. If instead the user specifies that the volume
 * that is selected should not be TMF configured, then the
 * auditedFlagTMF bit of statConfigBooles will be set to 0, but the
 * corresponding bit of the statConfigBoolesMask will still be set to
 * 1.
 *
 * statConfigStates is handled similarly. For example, if a user
 * specifies that the volume that is selected must be up, then the
 * availability bits of statConfigStates will both be set to 1, and
 * both corresponding bits of statConfigStatesMask will be set to 1.
 * By default, volumes that are down, isolated or quarantined within
 * the pool should not be considered for volume selection.
 *
 * RESULTS
 *
 * void.
 *
 * SIDE EFFECTS
 *
 * None.
 *
 * Created: Fri Aug 11 10:58:20 1995
 * Author: Sitaram Venkatraman
 ***********************************************************************
 */
static
void
PMSel_ConstructStatConfigInfo_v
(
    PMSel_SelCriteriumStruct selCriteria[],
                    /* IN: REQUIRED
                     * List of criteria selected
                     * volume must satisfy.
                     */
    SMS_Int16 numCriteria,
                    /* IN: REQUIRED
                     * Number of criteria in list.
                     */
    SMS_ByteStatConfigBooleanStruct* statConfigBoolesMaskPtr,
                    /* OUT: REQUIRED
                     * Pointer to the mask for status and
                     * configuration booleans.
                     */
    SMS_ByteStatConfigBooleanStruct* statConfigBoolesPtr,
                    /* OUT: REQUIRED
                     * Pointer to the status configuration
                     * booleans.
```

A-12

```
                        */
    SMS_ByteStatConfigStatesStruct* statConfigStatesMaskPtr,
                /* OUT: REQUIRED
                 * Pointer to the mask for status and
                 * configuration states.
                 */
    SMS_ByteStatConfigStatesStruct* statConfigStatesPtr
                /* OUT: REQUIRED
                 * Pointer to the status and configuration
                 * states.
                 */
)
{
    SMS_Int16 index = SMS_ZERO;
    SMS_DebuggingLabel( InitStatConfigAndBoolStructs );
    /*
     * Initialize statConfigBoolesPtr and statConfigStatesPtr to 0.
     */
    memset((void*)statConfigBoolesPtr,
           SMS_ZERO,
           (sizeof(SMS_ByteStatConfigBooleanStruct)));
    memset((void*)statConfigStatesPtr,
           SMS_ZERO,
           (sizeof(SMS_ByteStatConfigStatesStruct)));
    SMS_DebuggingLabel( InitStatConfigAndBoolMasks );
    /*
     * Initialize statConfigBoolesMaskPtr and statConfigStatesMaskPtr to 0.
     */
    memset((void*)statConfigBoolesMaskPtr,
           SMS_ZERO,
           (sizeof(SMS_ByteStatConfigBooleanStruct)));
    memset((void*)statConfigStatesMaskPtr,
           SMS_ZERO,
           (sizeof(SMS_ByteStatConfigStatesStruct)));
    SMS_DebuggingLabel( SetDefaultValues );
    /*
     * Set up the default status and configuration values.
     * The default values have to be setup in the status configuration
     * variables as well as the status configuration mask variables.
     * Do not look at quarantined and isolated volumes.
     * Do not look at volumes that are not up.
     *
     * The mask for the statConfigStates is set to 3. We want to enable
     * all the bits in the availabilityState field. Since this field
     * consists of two bits, we set the default value to 3.
     */
    (statConfigBoolesPtr-> configStatBool).quarantineFlag = 0;
    (statConfigBoolesPtr-> configStatBool).isolateFlag = 0;
    (statConfigBoolesMaskPtr-> configStatBool).quarantineFlag = 1;
    (statConfigBoolesMaskPtr-> configStatBool).isolateFlag = 1;
    (statConfigStatesPtr-> configStates).availabilityState = SMS_VOLSTATE_VOLISUP;
    (statConfigStatesMaskPtr-> configStates).availabilityState = 3;
    SMS_DebuggingLabel( SetActualValues );
    /*
     * Set the values in the status and configuration structures and
     * masks depending on the selection criteria specified in the
```

```
 * input.
 */
for (index = SMS_ZERO; index < numCriteria; ++index)
{
  /*
   * Set the appropriate values depending on the selection
   * criteria.
   */
  switch (selCriteria[index].criteriumID)
  {
    /*
     * Everytime a new criteria is added for which a bit field
     * and a mask needs to be set, a new case statement needs to
     * be added below.
     */
    case PMSEL_TMFCONFIGURED:
    {
      (statConfigBoolesMaskPtr->
       configStatBool).auditedFlagTMF = 1;
      if (*(SMS_Int16*)(selCriteria[index].val))
      {
        (statConfigBoolesPtr-> configStatBool).auditedFlagTMF = 1;
      }
      else
      {
        (statConfigBoolesPtr-> configStatBool).auditedFlagTMF = 0;
      }
      break;
    }
    case PMSEL_AUDITED:
    {
      (statConfigBoolesMaskPtr->
       configStatBool).auditedFlagDP2 = 1;
      if (*(SMS_Int16*)(selCriteria[index].val))
      {
        (statConfigBoolesPtr-> configStatBool).auditedFlagDP2 = 1;
      }
      else
      {
        (statConfigBoolesPtr-> configStatBool).auditedFlagDP2 = 0;
      }
      (statConfigBoolesMaskPtr->
       configStatBool).auditLoggingStatusFlag = 1;
      (statConfigBoolesPtr-> configStatBool).auditLoggingStatusFlag = 1;
      break;
    }
    case PMSEL_MIRRORCONFIGURED:
    {
      (statConfigBoolesMaskPtr->
       configStatBool).mirrorFlagSYSGEN = 1;
      if (*(SMS_Int16*)(selCriteria[index].val))
      {
        (statConfigBoolesPtr-> configStatBool).mirrorFlagSYSGEN = 1;
      }
      else
      {
```

A-14

```
        (statConfigBoolesPtr-> configStatBool).mirrorFlagSYSGEN = 0;
      }
      break;
    }
    case PMSEL_MIRRORED:
    {
      (statConfigBoolesMaskPtr->
       configStatBool).mirrorFlagDP2 = 1;
      if (*(SMS_Int16*)(selCriteria[index].val))
      {
        (statConfigBoolesPtr-> configStatBool).mirrorFlagDP2 = 1;
      }
      else
      {
        (statConfigBoolesPtr-> configStatBool).mirrorFlagDP2 = 0;
      }
      break;
    }
    case PMSEL_AVAILABLE:
    {
      /*
       * We do not do anything for this case since the
       * availabilityFlag has already been set above. For now,
       * that is the only status of interest.
       */
      break;
    }
    default:
    {
      /*
       * If we reach here, it does not mean that the criteriumID
       * is invalid. The criteriumID has already been validated
       * by the calling routine. It just means that the
       * criteriumID might be one for which no mask or bit field
       * needs to be set like PMSEL_PRIMARYCPU,
       * or one for which we assume a default value like
       * PMSEL_QUARANTINED, PMSEL_ISOLATED.
       * Just continue with the next element in the loop.
       */
      continue;
    }
  } /* switch (selCriteria[index].criteriumID) */
} /* for (index = SMS_ZERO; index < numCriteria; ++index) */
SMS_DebuggingLabel ( FunctionExit );
return;
#pragma nowarn(93)
} /* PMSel_ConstructStatConfigInfo_v() */
#pragma warn(93)
#pragma PAGE "PMSel: PMSel_ComputeStatsVal_v -- Compute stats val for a volume."
/*PRIVATE*********************************************************************
 *
 * PMSel_ComputeStatsVal_v --
 *
 * DESCRIPTION
 *
 * Sitaram Venkatraman    Wed Jul 22 13:45:46 1998
```

```
*
* The purpose of this routine is to find a volume's entry in the
* volDesc->volStatsArray and copy the proper values from that entry into
* saeELementPtr.
* The volumes for which statistics haven't been reported will not have entries
* in the volStatsArray.
* If no statistics are found for the volume, the fields in saeELementPtr will
* be set to -1.
*
* RESULTS
*
* void.
*
* SIDE EFFECTS
*
* None.
*
* Created: Fri Aug 11 15:03:13 1995
* Author: Sitaram Venkatraman
***********************************************************************
*/
static
void
PMSel_ComputeStatsVal_v
(
  PMComm_VolDescStruct* volDescPtr,
                /* IN: REQUIRED
                 * Pointer to descriptor for the
                 * volume data structures updated
                 * by PMComm unpacking routines.
                 */
  SMS_ExtVolumeNameType* volNamePtr,
                /* IN: REQUIRED
                 * Pointer to the name of volume to
                 * search for.
                 */
  PMSel_ScratchArrayEntryStruct* saeELementPtr
                /* OUT: REQUIRED
                 * Pointer to a scratch array element. The fields
                 * of this structure are filled up if a matching
                 * volume is found in the volStatsArray.
                 */
)
{
  SMS_Int16 index = SMS_ZERO;
  PMComm_VolStatsStruct* lVolStatsPtr = NULL;
  SMS_DebuggingLabel ( ValidateParams );
  /*
   * Verify that all the pointers are valid.
   */
  SMS_AssertTruth(! SMSMem_MemAddrIsNull (volDescPtr ));
  SMS_AssertTruth(! SMSMem_MemAddrIsNull (volNamePtr ));
  SMS_AssertTruth(! SMSMem_MemAddrIsNull (saeELementPtr ));
  SMS_DebuggingLabel ( InitOutputParams );
  /*
   * Initialize the output parameters to values that will be returned
```

```
 * if a matching volume is not found in volStatsArray.
 */
saeELementPtr-> volStatsIndex = -1;
saeELementPtr-> pagesFree = -1;
saeELementPtr-> volCapacity_l = -1;
saeELementPtr-> largestVolFragment_l = -1;
SMS_DebuggingLabel ( FindVolAndComputeStats );
/*
 * Find the matching volume in volStatsArray. If a matching volume is found,
 * copy the statistics information into saeELementPtr and return to the
 * caller. Otherwise check the next volume in volStatsArray.
 *
 * Since the volStatsArray is an address in the structure pointed
 * to by (volDescPtr-> volStatsArray), we need to access it with a
 * pointer of type PMComm_VolStatsStruct. Also, we will
 * access the array elements by doing pointer arithmetic rather
 * than by indexing using subscripts. The reason for this is that
 * while debugging, we can check the pointer elements better using
 * INSPECT. If we use subscripts, we will only be able to view the
 * first element in the array.
 */
lVolStatsPtr = (PMComm_VolStatsStruct*)(volDescPtr-> volStatsArray);
if (SMSMem_MemAddrIsNull ( lVolStatsPtr ))
{
  /*
   * Return to the caller with the default values.
   */
   goto FunctionExit;
}
while (index < (volDescPtr-> volStatsSize))
{
  if ((strncmp((char *)volNamePtr,
          (char *)&(lVolStatsPtr-> volName),
          (sizeof(SMS_ExtVolumeNameType) - 1))) == SMS_ZERO)
  {
    /*
     * It means that a matching volume has been found. Set the
     * output parameters appropriately and return to the caller.
     */
    saeELementPtr-> volStatsIndex = index;
    saeELementPtr-> pagesFree = lVolStatsPtr-> pagesFree;
    saeELementPtr-> timesSelected = lVolStatsPtr-> timesSelected;
    saeELementPtr-> volCapacity_l = lVolStatsPtr-> volCapacity_l;
    saeELementPtr-> largestVolFragment_l =
    lVolStatsPtr-> largestVolFragment_l;
    goto FunctionExit;
  }
  else
  {
    /*
     * Increment the pointer to point to the next element.
     * Check the next volume in the array.
     */
    lVolStatsPtr++;
    index++;
  }
```

```
    } /* while (index < (volDescPtr-> volStatsSize)) */
    SMS_DebuggingLabel ( FunctionExit );
    return;
#pragma nowarn(93)
} /* PMSel_ComputeStatsVal_v() */
#pragma warn(93)
#pragma PAGE "PMSel: PMSel_AddEntryToScratchArray -- Add an entry into a scratch volume array."
/*PRIVATE***********************************************************************
 *
 * PMSel_AddEntryToScratchArray --
 *
 * DESCRIPTION
 *
 * Sitaram Venkatraman    Wed Jul 22 13:50:05 1998
 *
 * The purpose of this routine is to add a volume entry to the scratch array
 *
 * RESULTS
 *
 * FEOK      - on success.
 * FE*       - otherwise.
 *
 * SIDE EFFECTS
 *
 * None.
 *
 * Created: Mon Aug 14 10:55:32 1995
 * Author:  Sitaram Venkatraman
 *******************************************************************************
 */
static
SMS_ErrType
PMSel_AddEntryToScratchArray
(
    PMSel_ScratchArrayEntryStruct* saeELementPtr,
                /* IN: REQUIRED
                 * Pointer to an element that needs to be added to
                 * the scratch array.
                 */
    PMSel_ScratchArrayEntryStruct scratchArray[],
                /* IN/OUT: REQUIRED
                 * Scratch array for volumes
                 * under consideration.
                 */
    SMS_Int16 scratchArraySize,
                /* IN: REQUIRED
                 * Number of entries in
                 * scratchArray.
                 */
    SMS_Int16* lastElemIndexPtr
                /* IN/OUT: REQUIRED
                 * Pointer to the index of the last
                 * element in the array. This parameter
                 * is defined by the caller of this
                 * function but maintained by this
                 * function.
```

```c
          */
)
{
  SMS_Int16 return_code = FEOK;
  SMS_Int16 insertIndex = -1; /* Some invalid value. */
  SMS_DebuggingLabel ( ValidateParams );
  SMS_AssertTruth(! SMSMem_MemAddrIsNull (saeELementPtr ));
  SMS_AssertTruth(! SMSMem_MemAddrIsNull (lastElemIndexPtr ));
  SMS_AssertTruth(scratchArraySize > SMS_ZERO);
  /*
   * The scratch array will always be big enough to accommodate all the volumes
   * since the PMSel_SelectVol() function allocates enough memory based on the
   * number of volumes in the volInfoArray.
   */
  SMS_PermAssertTruth_StopProcess((*lastElemIndexPtr) < (scratchArraySize - 1));
  SMS_DebuggingLabel ( SetInsertIndex );
  insertIndex = (SMS_Int16)((*lastElemIndexPtr) + 1);
  /*
   * Now copy the new element in the scratch array at the position
   * specified by insertIndex.
   * Remember to update the lastElemIndexPtr.
   */
  (*lastElemIndexPtr)++;
  memcpy(&scratchArray[insertIndex],
         saeELementPtr,
         sizeof(PMSel_ScratchArrayEntryStruct)
        );
  SMS_DebuggingLabel ( FunctionExit );
  return(return_code);
#pragma nowarn(93)
} /* PMSel_AddEntryToScratchArray() */
#pragma warn(93)
#pragma PAGE "PMSel: PMSel_ProcessVolsInSubset -- Select or reject vols in subset."
/*PRIVATE************************************************************
 *
 * PMSel_ProcessVolsInSubset --
 *
 * DESCRIPTION
 *
 * The purpose of this routine is to set up information in a considerMeArray
 * such that depending on the subset type, the volumes in the subset will or
 * will not be considered during selection.
 *
 * The considerMeArray is actually an array of booleans. The value of each
 * boolean will indicate whether or not the volume specified in the
 * corresponding array element in the volInfoArray is considered for
 * selection. This is actually a means of filtering out undesired volumes from
 * selection or limiting the selection range to specific volumes.
 *
 * For every entry in the subset, we first verify that the volID specified in
 * that entry is a valid index into the volInfoArray. If it is, then we set the
 * corresponding considerMeArray element appropriately. If not, we try to find
 * the volInfoArray element that has the same volName as the one specified in
 * the subset entry and set the considerMeArray element accordingly. Otherwise,
 * it means that the volume indicated by the subset entry is not in the pool.
 *
```

```
* The logic to process volumes in the subset is as follows :
* - For every element in the subset,
*   - if the volID in the element is valid,
*     - check whether the volName in this element and in the volInfoArray
*       element indexed by this volID match.
*       - if the names match,
*         - set the corresponding considerMeArray element appropriately.
*       - else
*         - find a volInfoArray element with the same volName as the one
*           in the subset element.
*         - if such an element is found,
*           - set the corresponding considerMeArray element
*             appropriately.
*           - set the subset element's volID to the index of the matching
*             volInfoArray element.
*         - else
*           - set the subset element's volID to PMSEL_VOLNOTINPOOL.
*
* RESULTS
*
* FEOK      - on success.
* FESMSNOPHYSVOLSAVAIL - if subset type is PMSEL_INCLUDE and none of the
*                       volumes in the subset are in the pool or no volumes
*                       are specified in the subset.
* FE*       - otherwise.
*
* SIDE EFFECTS
*
* None.
*
* Created: Thu Aug 17 17:12:21 1995
* Author: Sitaram Venkatraman
***************************************************************************
*/
static
SMS_ErrType
PMSel_ProcessVolsInSubset
(
  PMComm_VolDescStruct* volDescPtr,
            /* IN: REQUIRED
             * Ptr to descriptor for the
             * volume data structures updated
             * by PMComm unpacking routines.
             */
  PMSel_SubsetDescStruct* subsetDescPtr,
            /* IN/OUT: REQUIRED
             * Descriptor for the
             * list of volumes
             * to include/exclude.
             * pass NULL if no subset.
             */
  SMS_Boolean considerMeArray[]
            /* OUT: REQUIRED
             * Array of booleans, one for each element in the
             * volInfoArray.
             */
```

```c
)
{
  SMS_Int16 return_code = FEOK;
  SMS_Int16 index = SMS_ZERO;
  SMS_Boolean considerMeMarker = SMS_TRUE;
  SMS_Boolean subsetVolInPoolFlag = SMS_FALSE;
  PMComm_VolInfoStruct* tempVolInfoPtr = NULL;
  PMSel_SubsetLinkElementStruct* lSubsetLinkElemPtr = NULL;
  SMS_DebuggingLabel ( ValidateParams );
  SMS_AssertTruth(! SMSMem_MemAddrIsNull (volDescPtr ));
  SMS_AssertTruth((memcmp(volDescPtr-> eyeCatcher,
              PMCOMM_VOLDESC_EYECATCHER,
              SMS_MAXEYECATCHERBYTES)) == 0);
  SMS_AssertTruth(! SMSMem_MemAddrIsNull
          ((void*)(volDescPtr-> volInfoArray) ));
  SMS_AssertTruth((volDescPtr-> volInfoSize) > SMS_ZERO);
  SMS_DebuggingLabel ( InitializeBooleanArray );
  /*
   * Initialize the array of booleans.
   */
  if (! SMSMem_MemAddrIsNull (subsetDescPtr ))
  {
    SMS_AssertTruth((memcmp(subsetDescPtr-> eyeCatcher,
                PMSEL_SUBSETDESC_EYECATCHER,
                SMS_MAXEYECATCHERBYTES)) == 0);
    if (subsetDescPtr-> subsetType == PMSEL_INCLUDESUBSET)
    {
      /*
       * Verify that the subset contains atleast one element.
       */
      if (!(subsetDescPtr-> subsetSize) > SMS_ZERO)
      {
        /*
         * No elements in the subset list.
         * Return an error to the caller.
         */
        return_code = FESMSNOPHYSVOLSAVAIL;
        goto FunctionExit;
      }
      /*
       * Subset type is PMSEL_INCLUDESUBSET.
       * Initialize the array of booleans to SMS_FALSE and
       * considerMeMarker to SMS_TRUE.
       */
      considerMeMarker = SMS_TRUE;
      for (index = SMS_ZERO;
           index < (volDescPtr-> volInfoSize);
           ++index)
      {
        considerMeArray[index] = SMS_FALSE;
      }
    } /* if (subsetDescPtr-> subsetType == PMSEL_INCLUDESUBSET) */
    else
    {
      /*
       * Subset type is PMSEL_EXCLUDESUBSET.
```

```
     * Initialize the array of booleans to SMS_TRUE and
     * considerMeMarker to SMS_FALSE.
     */
    considerMeMarker = SMS_FALSE;
    for (index = SMS_ZERO;
        index < (volDescPtr-> volInfoSize);
        ++index)
    {
      considerMeArray[index] = SMS_TRUE;
    }
  } /* if (subsetDescPtr-> subsetType ==
   *    PMSEL_INCLUDESUBSET)... else...
   */
} /* if (! SMSMem_MemAddrIsNull (subsetDescPtr )) */
else
{
  /*
   * Subset has not been specified.
   * Initialize the array of booleans to SMS_TRUE.
   */
  for (index = SMS_ZERO;
      index < (volDescPtr-> volInfoSize);
      ++index)
  {
    considerMeArray[index] = SMS_TRUE;
  }
} /* if (! SMSMem_MemAddrIsNull (subsetDescPtr ))... else... */
SMS_DebuggingLabel ( CheckIfSubsetContainsElements );
/*
 * If a subset has been specified, then for each volume in the
 * subset, find the corresponding volume in the volInfoArray and
 * set the considerMeArray element for that entry appropriately.
 */
if (! SMSMem_MemAddrIsNull (subsetDescPtr ))
{
  SMS_DebuggingLabel ( RetrieveSubsetElement );
  /*
   * The subset entries are on a linked list, so we need to
   * traverse the list to retrieve each entry.
   */
  lSubsetLinkElemPtr = LList_FirstElement(&(subsetDescPtr->
                      subsetListHeader),
                    PMSel_SubsetLinkElementStruct,
                    subsetLink);
  /*
   * We tried to retrieve the element only after verifying that
   * the list does contain elements. Hence, we assert that the
   * element is not nil.
   */
  SMS_AssertTruth(!(LList_ElementIsNil(&(subsetDescPtr->
                      subsetListHeader),
                    lSubsetLinkElemPtr,
                    subsetLink)));
  /*
   * Check whether the subset entry's volume Id is a valid index
   * into the volInfoArray.
```

```
 * If not, scan the volInfoArray for an element containing the
 * same volume name as specified in the subset entry.
 * When a match is found, set the considerMeArray element
 * corresponding to the matching volInfoArray element
 * accordingly.
 * Repeat the steps for every element in the subset list.
 */
do
{
  /*
   * First of all, assert that the most recently retrieved link
   * element is valid.
   */
  SMS_AssertTruth((memcmp(lSubsetLinkElemPtr-> eyeCatcher,
              PMSEL_SUBSETLINKELEMENT_EYECATCHER,
              SMS_MAXEYECATCHERBYTES)) == 0);
  SMS_DebuggingLabel ( ValidateVolIDInElement );
  SMS_DebuggingLabel ( FindMatchInVolInfoArray );
  /*
   * Check whether the volID in the subset entry is valid.
   * Verify that it lies within the range of the volInfoArray
   * size.
   */
  if (((lSubsetLinkElemPtr-> volIDInfo).volID >= SMS_ZERO) &&
      ((lSubsetLinkElemPtr-> volIDInfo).volID < (volDescPtr->
                          volInfoSize)))
  {
    /*
     * The volID is valid. Now check whether the volID is a
     * valid index into the volInfoArray. Use a temporary pointer to
     * refer to the element in the volInfoArray. The temporary pointer
     * helps to view the contents of the element when debugging using
     * INSPECT.
     * The element is accessed as follows:
     * - cast volInfoArray from volDescPtr as an address to a struct of
     *   type PMComm_VolInfoStruct.
     * - use the volID from (lSubsetLinkElemPtr-> volIDInfo) as a
     *   subscript for the structure pointer obtained above.
     * - specifying the subscript takes off the indirection from the
     *   structure address; take the address of this element before
     *   assigning it to tempVolInfoPtr.
     */
    tempVolInfoPtr =
    &(((PMComm_VolInfoStruct*)(volDescPtr->
              volInfoArray))[(lSubsetLinkElemPtr->
                          volIDInfo).volID]);
    if (strncmp((char *)&((lSubsetLinkElemPtr-> volIDInfo).volName),
          (char *)&(tempVolInfoPtr-> volName),
          (sizeof (tempVolInfoPtr-> volName) - 1)) == SMS_ZERO)
    {
      /*
       * volID is a valid index into the volInfoArray. Set the
       * corresponding considerMeArray element accordingly.
       */
      considerMeArray[(lSubsetLinkElemPtr-> volIDInfo).volID] =
      considerMeMarker;
```

```
    /*
     * Set a flag to indicate that a volume from the subset was also
     * found in the pool.
     */
    subsetVolInPoolFlag = SMS_TRUE;
}
else
{
    /*
     * volID is not a valid index into the volInfoArray. Find the
     * entry in volInfoArray that has the same volName as that in the
     * subset element.
     * Let tempVolInfoPtr be a pointer to the first element in the
     * volInfoArray.
     */
    tempVolInfoPtr = ((PMComm_VolInfoStruct*)(volDescPtr->
                        volInfoArray));
    for (index = SMS_ZERO;
        index < (volDescPtr-> volInfoSize);
        ++index)
    {
        if (strncmp((char *)&
                ((lSubsetLinkElemPtr-> volIDInfo).volName),
                (char *)&(tempVolInfoPtr-> volName),
                (sizeof ((lSubsetLinkElemPtr-> volIDInfo).volName)
                - 1 )) == SMS_ZERO)
        {
            /*
             * Found a matching element in the volInfoArray. Set the
             * corresponding considerMeArray element accordingly.
             * Also update the volID in the subset link element.
             */
            considerMeArray[index] = considerMeMarker;
            (lSubsetLinkElemPtr-> volIDInfo).volID = index;
            /*
             * Set a flag to indicate that a volume from the subset was also
             * found in the pool.
             */
            subsetVolInPoolFlag = SMS_TRUE;
            break;
        }
        tempVolInfoPtr++;
    } /* for (index = SMS_ZERO;
      *     index < (volDescPtr-> volInfoSize);
      *     ++index)
      */
    /*
     * Check whether a matching element was found in the
     * volInfoArray. If not, it means that the volName specified
     * in the subset link element is not in the pool. Update the
     * volID in the subset link element to indicate that.
     * If considerMeArray[index] = considerMeMarker, it means that
     * a match was found.
     */
    if (!(considerMeArray[index] == considerMeMarker))
    {
```

A-24

```
            (lSubsetLinkElemPtr-> volIDInfo).volID = PMSEL_VOLNOTINPOOL;
         }
      } /* if (strncmp(&((lSubsetLinkElemPtr-> volIDInfo).volName),
       *              &(tempVolInfoPtr-> volName),
       *              (sizeof ((lSubsetLinkElemPtr-> volIDInfo).volName)
       * else...
       */
    } /* if (((lSubsetLinkElemPtr-> volIDInfo).volID >= SMS_ZERO) &&
     *     ((lSubsetLinkElemPtr-> volIDInfo).volID <
     *      (volDescPtr-> volInfoSize)))
     */
    /*
     * Get the next element in the list.
     */
    lSubsetLinkElemPtr = LList_NextElement(lSubsetLinkElemPtr,
                        PMSel_SubsetLinkElementStruct,
                        subsetLink);
    /*
     * End the loop if the element retrieved above is NIL. It means
     * that we have already processed the last element in the list.
     */
  } while (!(LList_ElementIsNil(&(subsetDescPtr->
                    subsetListHeader),
                    lSubsetLinkElemPtr,
                    subsetLink)));
  /*
   * If the subset has specified volumes to be included and the volumes that
   * are specified are not in the pool, return an error to the caller.
   */
  if ((subsetDescPtr-> subsetType == PMSEL_INCLUDESUBSET) &&
      (!subsetVolInPoolFlag))
  {
    return_code = FESMSNOPHYSVOLSAVAIL;
    goto FunctionExit;
  }
} /* if (! SMSMem_MemAddrIsNull (subsetDescPtr )) */
SMS_DebuggingLabel ( FunctionExit );
return(return_code);
#pragma nowarn(93)
} /* PMSel_ProcessVolsInSubset() */
#pragma warn(93)
#pragma PAGE "PMSel: PMSel_ComputeSelHeapSize -- Compute heap size for vol. select routine."
/*EXPORT***********************************************************************
 *
 * PMSel_ComputeSelHeapSize --
 *
 * DESCRIPTION
 *
 * The purpose of this routine is to compute the size of the heap
 * required for the temporary working area of the selection
 * routine. The computed heap size will be large enough to hold a
 * subset of all the volumes currently in the storage pool. In most
 * situations, this is a great overestimate. The overestimating
 * approach was chosen for simplicity, and because it is not clear
 * that returning an exact size for each caller is necessary. Callers
 * who know that their maximum subset size will be some percentage of
```

```
 * the volumes in the pool can multiply the heap size that is returned
 * by that percentage in order to get a more precise heap size. If for
 * some reason this does pose a problem, an alternative would be to
 * add another parameter to the routine that describes the maximum
 * number of volumes that the caller believes subset will contain,
 * and compute the heap size from that estimate.
 *
 * RESULTS
 *
 * FEOK     - on success.
 * FE*      - otherwise.
 *
 * SIDE EFFECTS
 *
 * None.
 *
 * Created: Tue Aug  8 10:23:49 1995
 * Author:  Sitaram Venkatraman
 *****************************************************************************
 */
SMS_ErrType
PMSel_ComputeSelHeapSize
(
  PMComm_VolDescStruct* volDescPtr,
              /* IN: REQUIRED
               * Ptr to descriptor for the
               * volume data structures updated
               * by PMComm unpacking routines.
               */
  SMS_Int32* selHeapSizePtr
              /* OUT: REQUIRED
               * Ptr to the size in bytes of
               * the heap needed for the
               * selection routine's temporary
               * working area.
               */
)
{
  SMS_Int16 return_code = FEOK;
  SMS_DebuggingLabel ( ValidateParams );
  /*
   * Check that volDesc has valid values.
   */
  SMS_AssertTruth(memcmp(volDescPtr-> eyeCatcher,
              PMCOMM_VOLDESC_EYECATCHER,
              SMS_MAXEYECATCHERBYTES)
          != 0);
  SMS_AssertTruth((volDescPtr-> volInfoSize) > 0);
  SMS_DebuggingLabel ( ComputeHeapSize );
  *selHeapSizePtr = (SMS_Int32)((volDescPtr-> volInfoSize) *
              ((sizeof(PMSel_ScratchArrayEntryStruct)) +
              (sizeof(SMS_Boolean))));
  SMS_DebuggingLabel ( FunctionExit );
  return(return_code);
#pragma nowarn(93)
} /* PMSel_ComputeSelHeapSize() */
```

```
#pragma warn(93)
#pragma PAGE "PMSel: PMSel_ComputeSubsetHeapSize -- Compute heap size for subset data structures."
/*EXPORT***********************************************************************
 *
 * PMSel_ComputeSubsetHeapSize --
 *
 * DESCRIPTION
 *
 * The purpose of this routine is to compute the size of the heap
 * required for the data structures maintained by the subset
 * routines. The heap size is a function of the number of volumes in
 * the pool; this routine will determine the current number of volumes
 * in the pool, and return a size large enough to hold information for
 * all of them, plus additional room to allow for growth.
 *
 * RESULTS
 *
 * FEOK      - on success.
 * FE*       - otherwise.
 *
 * SIDE EFFECTS
 *
 * None.
 *
 * Created: Mon Aug  7 10:10:45 1995
 * Author:  Sitaram Venkatraman
 *******************************************************************************
 */
SMS_ErrType
PMSel_ComputeSubsetHeapSize
(
    PMComm_VolDescStruct *volDescPtr,
                /* IN: REQUIRED
                 * Pointer to descriptor for the volume
                 * data structures updated by PMComm
                 * unpacking routines.
                 */
    SMS_Int32 *subsetHeapSizePtr
                /* OUT: REQUIRED
                 * Pointer to the size in bytes of the
                 * heap needed to hold subset data
                 * structures.
                 */
)
{
    SMS_Int16 return_code = FEOK;
    /*
     * Check input parameters.
     */
    SMS_DebuggingLabel ( ValidateParams );
    /*
     * Check that volDesc has valid values.
     */
    SMS_AssertTruth(memcmp(volDescPtr-> eyeCatcher,
                PMCOMM_VOLDESC_EYECATCHER,
                SMS_MAXEYECATCHERBYTES)
```

```
        != 0);
    SMS_AssertTruth((volDescPtr-> volInfoSize) > 0);
    SMS_DebuggingLabel ( ComputeHeapSize );
    /*
     * Compute the size of the subset heap as the number of volumes in
     * the pool times the size of the subset link element structure,
     * and a little more.
     */
    *subsetHeapSizePtr = (SMS_Int32)((PMSEL_ARRAYFUDGEFACTOR *
                        (volDescPtr-> volInfoSize)) *
                        (sizeof(PMSel_SubsetLinkElementStruct)));
    SMS_DebuggingLabel ( FunctionExit );
    return(return_code);
#pragma nowarn(93)
} /* PMSel_ComputeSubsetHeapSize() */
#pragma warn(93)
#pragma PAGE "PMSel: PMSel_InitSubsetDesc -- Initialize subset of volumes."
/*EXPORT***********************************************************************
 *
 * PMSel_InitSubsetDesc --
 *
 * DESCRIPTION
 *
 * The purpose of this routine is to allocate and initialize a volume
 * subset descriptor that will also serve as a container for storing a
 * list of volumes in the subset. This descriptor may later be
 * passed to the PMSel_SelectVol routine. The volumes in the subset
 * will be stored as a linked list using the Shared Code LList module.
 *
 * RESULTS
 *
 * FEOK      - on success.
 * FE*       - otherwise.
 *
 * SIDE EFFECTS
 *
 * None.
 *
 * Created: Tue Aug  8 13:25:14 1995
 * Author:  Sitaram Venkatraman
 ******************************************************************************
 */
SMS_ErrType
PMSel_InitSubsetDesc
(
    SMS_Int16 subsetType,
                /* IN: REQUIRED
                 * How this subset should be used
                 * PMSEL_EXCLUDESUBSET for
                 * exclusion subset,
                 * PMSEL_INCLUDESUBSET for
                 * inclusion subset.
                 */
    SMS_Addr32 subsetHeapAddr,
                /* IN: REQUIRED
                 * Address of an initialized,
```

```
                        * resizeable heap or subheap
                        * from which to allocate new
                        * nodes. The size required may
                        * be obtained via a call
                        * to PMSel_ComputeSubsetHeapSize.
                        */
    void** subsetDescPtrPtr
                        /* OUT: REQUIRED
                        * Pointer to pointer to the a
                        * subset descriptor. The memory for the
                        * subset descriptor will be allocated
                        * in this routine and its address will
                        * be returned in this parameter.
                        */
)
{
  SMS_Int16 rcode = FEOK;
  SMS_Int16 return_code = FEOK;
  SMS_Int16 exceptionClass = SMS_ZERO;
  PMSel_SubsetDescStruct* lSubsetDescPtr = NULL;
  SMS_DebuggingLabel ( ValidateParams );
  /*
  * Check that subsetType has valid value.
  */
  SMS_AssertTruth((subsetType == PMSEL_EXCLUDESUBSET) ||
           (subsetType == PMSEL_INCLUDESUBSET));
  /*
  * Verify that subsetHeapAddr is not invalid.
  */
  SMS_AssertTruth(! SMSMem_MemAddrIsNull ((void *)subsetHeapAddr ));
  /*
  * Initialize the output parameter.
  */
  *subsetDescPtrPtr = NULL;
  SMS_DebuggingLabel ( AllocateSubsetDescriptor );
  rcode = SMSHeap_New((SMS_Addr*)&lSubsetDescPtr,
              (sizeof(PMSel_SubsetDescStruct)),
              (SMS_Int16*)subsetHeapAddr,
              &exceptionClass);
  if (rcode != FEOK)
  {
    return_code = rcode;
    goto FunctionExit;
  }
  SMS_DebuggingLabel ( InitializeSubsetDescriptor );
  memcpy(lSubsetDescPtr-> eyeCatcher,
       PMSEL_SUBSETDESC_EYECATCHER,
       SMS_MAXEYECATCHERBYTES);
  lSubsetDescPtr-> heapToUse = subsetHeapAddr;
  lSubsetDescPtr-> subsetType = subsetType;
  lSubsetDescPtr-> subsetSize = SMS_ZERO;
  /*
  * Initialize the subset link list header.
  */
  rcode = SMSLList_InitHeader(&(lSubsetDescPtr-> subsetListHeader),
              &exceptionClass);
```

```
        if (rcode != FEOK)
        {
          return_code = rcode;
          goto FunctionExit;
        }
        SMS_DebuggingLabel ( SetOutParmToSubsetDescriptorAddr );
        (*subsetDescPtrPtr) = (void*)lSubsetDescPtr;
        SMS_DebuggingLabel ( FunctionExit );
        return(return_code);
#pragma nowarn(93)
} /* PMSel_InitSubsetDesc() */
#pragma warn(93)
#pragma PAGE "PMSel: PMSel_ResetSubset -- Reset a subset to have 0 entries."
/*EXPORT**********************************************************************
 *
 * PMSel_ResetSubset --
 *
 * DESCRIPTION
 *
 * This routine resets a subset to an empty, initialized subset with 0
 * entries. This allows the subset to be reused without having to do a
 * PMSel_DisposeSubsetDesc and PMSel_InitSubsetDesc.
 *
 * RESULTS
 *
 * FEOK      - on success.
 * FE*       - otherwise.
 *
 * SIDE EFFECTS
 *
 * None.
 *
 * Created: Tue Aug  8 14:57:03 1995
 * Author:  Sitaram Venkatraman
 *****************************************************************************
 */
SMS_ErrType
PMSel_ResetSubset
(
  SMS_Int16 subsetType,
              /* IN: REQUIRED
               * How this subset should be used
               * PMSEL_EXCLUDESUBSET for
               * exclusion subset,
               * PMSEL_INCLUDESUBSET for
               * inclusion subset.
               */
  void* subsetDescPtr
              /* IN/OUT: REQUIRED
               * Pointer to the initialized
               * subset descriptor.
               */
)
{
  SMS_Int16 rcode = FEOK;
  SMS_Int16 return_code = FEOK;
```

```
SMS_Int16 exceptionClass = SMS_ZERO;
PMSel_SubsetLinkElementStruct* lSubsetLinkElemPtr = NULL;
PMSel_SubsetDescStruct* lSubsetDescPtr = NULL;
SMS_DebuggingLabel ( ValidateParams );
/*
 * Verify that subsetDescPtr is not invalid and initialize
 * lSubsetDescPtr with the address in it.
 */
SMS_AssertTruth(! SMSMem_MemAddrIsNull (subsetDescPtr ));
lSubsetDescPtr = (PMSel_SubsetDescStruct*)subsetDescPtr;
/*
 * Check that subsetDescPtr has valid values.
 */
SMS_AssertTruth((memcmp(lSubsetDescPtr-> eyeCatcher,
            PMSEL_SUBSETDESC_EYECATCHER,
            SMS_MAXEYECATCHERBYTES)) == 0);
SMS_AssertTruth(! SMSMem_MemAddrIsNull
        ((void *)(lSubsetDescPtr-> heapToUse) ));
/*
 * Check that subsetType has valid value.
 */
SMS_AssertTruth((subsetType == PMSEL_EXCLUDESUBSET) ||
        (subsetType == PMSEL_INCLUDESUBSET));
SMS_DebuggingLabel ( DisposeSubsetLinks );
/*
 * Dispose all the links referred to by
 * lSubsetDescPtr-> subsetListHeader.
 * - Find the first element in the list, starting at the list header.
 * - If an element is found,
 *   Remove that element from the list.
 *   Dispose the memory used by that element.
 * - Repeat the loop until the list is empty.
 */
while (!(LList_IsEmpty(&(lSubsetDescPtr-> subsetListHeader))))
{
  lSubsetLinkElemPtr = LList_FirstElement(&(lSubsetDescPtr->
                    subsetListHeader),
                    PMSel_SubsetLinkElementStruct,
                    subsetLink);
  /*
   * We tried to retrieve the element only after verifying that
   * the list does contain elements. Hence, we assert that the
   * element is not nil. Also, we verify the validity of the
   * element.
   */
  SMS_AssertTruth(!(LList_ElementIsNil(&(lSubsetDescPtr->
                    subsetListHeader),
                    lSubsetLinkElemPtr,
                    subsetLink)));
  SMS_AssertTruth((memcmp(lSubsetLinkElemPtr-> eyeCatcher,
            PMSEL_SUBSETLINKELEMENT_EYECATCHER,
            SMS_MAXEYECATCHERBYTES)) == 0);
  /*
   * Remove this element from the list. This operation will only
   * fix the link pointers in the list such that this element is
   * omitted. Removing an element from the list does not free any
```

```
 * memory.
 */
rcode = SMSLList_RemoveElement(&(lSubsetLinkElemPtr-> subsetLink),
                &exceptionClass);
if (rcode != FEOK)
{
  /*
   * Return the error to the caller.
   */
  return_code = rcode;
  goto FunctionExit;
}
/*
 * Now free the memory taken up by the list element.
 */
rcode = SMSHeap_Dispose((SMS_Addr*)lSubsetLinkElemPtr,
            (sizeof(PMSel_SubsetLinkElementStruct)),
            (SMS_Int16*)(lSubsetDescPtr-> heapToUse),
            &exceptionClass);
if (rcode != FEOK)
{
  return_code = rcode;
  goto FunctionExit;
}
} /* while
   * (!(LList_IsEmpty(&(lSubsetDescPtr-> subsetListHeader))))
   */
SMS_DebuggingLabel ( ResetSubsetDescFields );
lSubsetDescPtr-> subsetType = subsetType;
lSubsetDescPtr-> subsetSize = SMS_ZERO;
SMS_DebuggingLabel ( FunctionExit );
return(return_code);
#pragma nowarn(93)
} /* PMSel_ResetSubset() */
#pragma warn(93)
#pragma PAGE "PMSel: PMSel_DisposeSubsetDesc -- Dispose subset and release space."
/*EXPORT***********************************************************************
 *
 * PMSel_DisposeSubsetDesc --
 *
 * DESCRIPTION
 *
 * The purpose of this routine is to dispose of a subset and release
 * all associated space.
 *
 * RESULTS
 *
 * FEOK      - on success.
 * FE*       - otherwise.
 *
 * SIDE EFFECTS
 *
 * None.
 *
 * Created: Wed Aug  9 14:59:37 1995
 * Author:  Sitaram Venkatraman
```

```
/*******************************************************************************
 */
SMS_ErrType
PMSel_DisposeSubsetDesc
(
  void** subsetDescPtrPtr
                /* IN/OUT: REQUIRED
                 * Pointer to pointer to the
                 * subset descriptor.
                 */
)
{
  SMS_Int16 rcode = FEOK;
  SMS_Int16 return_code = FEOK;
  SMS_Int16 exceptionClass = SMS_ZERO;
  PMSel_SubsetDescStruct* lSubsetDescPtr = NULL;
  SMS_DebuggingLabel ( ValidateParams );
  /*
   * Verify that subsetDescPtrPtr is not invalid and initialize
   * lSubsetDescPtr with the address in it.
   */
  SMS_AssertTruth(! SMSMem_MemAddrIsNull ((*subsetDescPtrPtr) ));
  lSubsetDescPtr = (PMSel_SubsetDescStruct*)(*subsetDescPtrPtr);
  /*
   * Check that subsetDescPtrPtr has valid values.
   */
  SMS_AssertTruth((memcmp(lSubsetDescPtr-> eyeCatcher,
              PMSEL_SUBSETDESC_EYECATCHER,
              SMS_MAXEYECATCHERBYTES)) == 0);
  SMS_AssertTruth(! SMSMem_MemAddrIsNull
              ((void *)(lSubsetDescPtr-> heapToUse) ));
  SMS_DebuggingLabel ( DisposeSubsetDesc );
  /*
   * Dispose the subset links and then the subset descriptor itself.
   */
  rcode = PMSel_ResetSubset((lSubsetDescPtr-> subsetType),
              (*subsetDescPtrPtr));
  if (rcode != FEOK)
  {
    return_code = rcode;
    goto FunctionExit;
  }
  rcode = SMSHeap_Dispose((SMS_Addr*)(*subsetDescPtrPtr),
              (sizeof(PMSel_SubsetDescStruct)),
              (SMS_Int16*)(lSubsetDescPtr-> heapToUse),
              &exceptionClass);
  if (rcode != FEOK)
  {
    return_code = rcode;
    goto FunctionExit;
  }
  *subsetDescPtrPtr = NULL;
  SMS_DebuggingLabel ( FunctionExit );
  return(return_code);
#pragma nowarn(93)
} /* PMSel_DisposeSubsetDesc() */
```

```
#pragma warn(93)
#pragma PAGE "PMSel: PMSel_AddVolToSubset -- Add volume to a subset."
/*EXPORT*************************************************************
 *
 * PMSel_AddVolToSubset --
 *
 * DESCRIPTION
 *
 * The purpose of this routine is to add a volume specified as a
 * PMSel_VolIDStruct to a subset.
 *
 * FEOK      - on success.
 * FE*       - otherwise.
 *
 * SIDE EFFECTS
 *
 * None.
 *
 * Created: Wed Aug  9 15:38:46 1995
 * Author: Sitaram Venkatraman
 *********************************************************************
 */
SMS_ErrType
PMSel_AddVolToSubset
(
   PMSel_VolIDStruct* volPtr,
                  /* IN: REQUIRED
                   * Ptr to the volume to be added
                   * to the subset.
                   */
   void** subsetDescPtrPtr
                  /* IN/OUT: REQUIRED
                   * Pointer to pointer to the subset
                   * descriptor of subset to which
                   * the volume should be added.
                   */
)
{
   SMS_Int16 rcode = FEOK;
   SMS_Int16 return_code = FEOK;
   SMS_Int16 exceptionClass = SMS_ZERO;
   PMSel_SubsetLinkElementStruct* lSubsetLinkElemPtr = NULL;
   PMSel_SubsetDescStruct* lSubsetDescPtr = NULL;
   SMS_DebuggingLabel ( ValidateParams );
   /*
    * Verify that subsetDescPtrPtr is not invalid and initialize
    * lSubsetDescPtr with the address in it.
    */
   SMS_AssertTruth(! SMSMem_MemAddrIsNull ((*subsetDescPtrPtr) ));
   lSubsetDescPtr = (PMSel_SubsetDescStruct*)(*subsetDescPtrPtr);
   /*
    * Check that subsetDescPtrPtr has valid values. Refer to the contents of
    * subsetDescPtrPtr using lSubsetDescPtr henceforth.
    */
   SMS_AssertTruth((memcmp(lSubsetDescPtr-> eyeCatcher,
               PMSEL_SUBSETDESC_EYECATCHER,
```

A-34

```
                SMS_MAXEYECATCHERBYTES)) == 0);
SMS_AssertTruth(! SMSMem_MemAddrIsNull
        ((void *)(lSubsetDescPtr-> heapToUse) ));
SMS_DebuggingLabel ( AllocateSubsetLinkElement );
/*
 * Allocate space for a subset link element from the heap indicated
 * by lSubsetDescPtr-> heapToUse.
 */
rcode = SMSHeap_New((SMS_Addr*)&lSubsetLinkElemPtr,
        (sizeof(PMSel_SubsetLinkElementStruct)),
        (SMS_Int16*)(lSubsetDescPtr-> heapToUse),
        &exceptionClass);
if (rcode != FEOK)
{
  return_code = rcode;
  goto FunctionExit;
}
memset(lSubsetLinkElemPtr,
    SMS_ZERO,
    (sizeof(PMSel_SubsetLinkElementStruct)));
SMS_DebuggingLabel ( InitSubsetLinkElem );
/*
 * Initialize the subset link element.
 */
rcode = SMSLList_InitElement(&(lSubsetLinkElemPtr-> subsetLink),
            &exceptionClass);
if (rcode != FEOK)
{
  return_code = rcode;
  goto FunctionExit;
}
SMS_DebuggingLabel ( SetSubsetLinkElemFields );
/*
 * Initialize the subset link element fields and copy the input
 * volID information into the appropriate fields.
 */
memcpy(((lSubsetLinkElemPtr-> eyeCatcher),
    PMSEL_SUBSETLINKELEMENT_EYECATCHER,
    SMS_MAXEYECATCHERBYTES);
strncpy(((lSubsetLinkElemPtr-> volIDInfo).volName),
    (volPtr-> volName),
    (sizeof((lSubsetLinkElemPtr-> volIDInfo).volName) - 1));
(lSubsetLinkElemPtr-> volIDInfo).volID = volPtr-> volID;
SMS_DebuggingLabel ( AddLinkElemToSubsetList );
/*
 * Add the subset link element to the subset list.
 */
rcode = SMSLList_AppendLast(&(lSubsetDescPtr-> subsetListHeader),
            &(lSubsetLinkElemPtr-> subsetLink),
            &exceptionClass);
if (rcode != FEOK)
{
  return_code = rcode;
  goto FunctionExit;
}
SMS_DebuggingLabel ( IncrSubsetSize );
```

```
/*
 * Increment subset size.
 */
(lSubsetDescPtr-> subsetSize)++;
SMS_DebuggingLabel ( FunctionExit );
/*
 * If an error was encountered, free any memory that may have been
 * allocated.
 */
if (return_code != FEOK)
{
    if (! SMSMem_MemAddrIsNull (lSubsetLinkElemPtr ))
    {
        /* Memory was allocated, deallocate it. */
        rcode = SMSHeap_Dispose((SMS_Addr*)lSubsetLinkElemPtr,
                        (sizeof(PMSel_SubsetLinkElementStruct)),
                        (SMS_Int16*)(lSubsetDescPtr-> heapToUse),
                        &exceptionClass);
        SMS_AssertTruth(rcode == FEOK);
    }
}
    return(return_code);
#pragma nowarn(93)
} /* PMSel_AddVolToSubset() */
#pragma warn(93)
#pragma PAGE "PMSel: PMSel_DeleteVolFromSubset -- Delete a volume from a subset."
/*EXPORT*********************************************************************
 *
 * PMSel_DeleteVolFromSubset --
 *
 * DESCRIPTION
 *
 * The purpose of this routine is to delete a volume from a subset. We
 * do this by first finding a matching volume element in the subset
 * list and subsequently deleting it from the list and freeing the
 * memory allocated for that element.
 *
 * RESULTS
 *
 * FEOK     - on success.
 * FE*      - otherwise.
 *
 * SIDE EFFECTS
 *
 * None.
 *
 * Created: Thu Aug 10 10:07:04 1995
 * Author:  Sitaram Venkatraman
 *****************************************************************************
 */
SMS_ErrType
PMSel_DeleteVolFromSubset
(
    PMSel_VolIDStruct *volPtr,
                /* IN: REQUIRED
                 * Ptr to the volume to be
```

```
                        * deleted from the subset.
                        */
    void* subsetDescPtr
                /* IN/OUT: REQUIRED
                 * Ptr to the subset descriptor
                 * for subset from which
                 * the volume should be deleted.
                 */
)
{
    SMS_Int16 rcode = FEOK;
    SMS_Int16 return_code = FEOK;
    SMS_Int16 exceptionClass = SMS_ZERO;
    PMSel_SubsetLinkElementStruct* lSubsetLinkElemPtr = NULL;
    PMSel_SubsetDescStruct* lSubsetDescPtr = NULL;
    SMS_DebuggingLabel ( ValidateParams );
    /*
     * Verify that subsetDescPtr is not invalid and initialize
     * lSubsetDescPtr with the address in it.
     */
    SMS_AssertTruth(! SMSMem_MemAddrIsNull (subsetDescPtr ));
    lSubsetDescPtr = (PMSel_SubsetDescStruct*)subsetDescPtr;
    /*
     * Check that subsetDescPtr has valid values.
     */
    SMS_AssertTruth((memcmp(lSubsetDescPtr-> eyeCatcher,
                PMSEL_SUBSETDESC_EYECATCHER,
                SMS_MAXEYECATCHERBYTES)) == 0);
    /*
     * Retrieve the link element that we need to delete from the
     * subset.
     */
    PMSel_FindElemInSubset_v(&(volPtr-> volName),
                lSubsetDescPtr,
                &lSubsetLinkElemPtr);
    if (SMSMem_MemAddrIsNull ( lSubsetLinkElemPtr ))
    {
        /*
         * It means that a matching link element was not found in the
         * subset list. It implies that we do not have to delete
         * anything. Just return to the caller.
         */
        goto FunctionExit;
    }
    /*
     * A matching link element has been found. Remove this element from
     * the subset list and free the memory allocated to it.
     */
    rcode = SMSLList_RemoveElement(&(lSubsetLinkElemPtr-> subsetLink),
                &exceptionClass);
    if (rcode != FEOK)
    {
        /*
         * Return the error to the caller.
         */
        return_code = rcode;
```

```
    goto FunctionExit;
  }
  /*
   * Now free the memory taken up by the list element.
   */
  rcode = SMSHeap_Dispose((SMS_Addr*)lSubsetLinkElemPtr,
              (sizeof(PMSel_SubsetLinkElementStruct)),
              (SMS_Int16*)(lSubsetDescPtr-> heapToUse),
              &exceptionClass);
  if (rcode != FEOK)
  {
    return_code = rcode;
    goto FunctionExit;
  }
  SMS_DebuggingLabel ( FunctionExit );
  return(return_code);
#pragma nowarn(93)
} /* PMSel_DeleteVolFromSubset() */
#pragma warn(93)
#pragma PAGE "PMSel: PMSel_SelectVol -- Select a volume."
/*EXPORT***********************************************************************
 *
 * PMSel_SelectVol --
 *
 * DESCRIPTION
 *
 * Sitaram Venkatraman    Wed Jul 22 14:16:13 1998
 *
 * The purpose of this routine is to actually select a volume. The routine
 * requires an initialized heap from which to allocate a temporary working area
 * while the volume is being selected. A suggested size for that heap is
 * returned by PMSel_ComputeSelHeapSize.
 *
 * There are six steps to selecting a volume:
 *
 * 1. Choose numCandidates to be equal to volDesc-> volInfoSize.
 *
 * 2. Use any subsets specified by caller to filter out undesired volumes from
 * consideration.
 *
 * 3. Translate any selection criteria specified by the caller into bit fields
 * which can be compared with the status and configuration bit fields kept for
 * each volume. A mask is created for both the statConfigBooles bit field and
 * the statConfigStates bit field that indicates which bits of the bit field
 * should be compared. For example, a 1 in a bit in the statConfigBooles mask
 * indicates that the corresponding bit in the statConfigBooles bit field should
 * be compared. By default, non-isolated, non-quarantined volumes in the Up
 * state are considered. A caller may override this with selection criteria if
 * desired.
 *
 * 4. Apply the translated selection criteria to the volumes still
 * under consideration as follows:
 * -> Perform a bit-wise EXCLUSIVE OR between the corresponding
 * selection criteria bit field and the volume's bit field to
 * determine the bits in which they differ.
 * -> Perform a bit-wise AND between the EXCLUSIVE OR result and the
```

```
 * appropriate bit mask to determine which differences are important.
 *
 * 5. If this volume can accommodate the primary extent of the file being
 * created, then store it in a scratch array.
 *
 * 6. Repeat 4-5 for every volume in volInfoArray.
 *
 * 7. Scan the scratch array and select a volume based on the following
 * criteria:
 *
 * - Check whether or not the volume has enough space to accommodate the entire
 * file and that its largest extent is greater than or equal to the size of the
 * larger of the file's primary and secondary extent.
 *
 * Among volumes that match the above criteria, check whether this volume has
 * been selected the least number of times.
 *
 * Check whether this volume matches the cpu criteria if one has been specified.
 *
 * - Check whether or not the volume has met the previous criteria. If not,
 * check whether or not it can accommodate the file with a minimum number of
 * extents.
 *
 * Among volumes that match the above criteria, check whether this volume has
 * been selected the least number of times.
 *
 * - Check whether or not the volume has met the previous two criteria. If not,
 * choose a volume that has the biggest extent from amongst all volumes whose
 * largest extent is greater than or equal to requiredExtentSize.
 *
 * - Check whether or not the volume has met the previous three criteria. If
 * not, choose a volume that has the largest product of free space and biggest
 * extent.
 *
 * 8. Step 7 is repeated for all the volumes in the scratch array in order to
 * find the best match for the criteria in the order specified.
 *
 * RESULTS
 *
 * FEOK      - on success.
 * FE*       - otherwise.
 *
 * SIDE EFFECTS
 *
 * None.
 *
 * Created: Wed Aug 16 12:23:16 1995
 * Author:  Sitaram Venkatraman
 **************************************************************************
 */
SMS_ErrType
PMSel_SelectVol
(
  PMComm_VolDescStruct* volDescPtr,
                /* IN: REQUIRED
                 * Ptr to descriptor for the
```

```
                        * volume data structures updated
                        * by PMComm unpacking routines.
                        */
        SMS_Addr32 heapToUse,
                        /* IN: REQUIRED
                        * Address of initialized,
                        * resizeable heap or subheap
                        * from which a temporary
                        * working area will be
                        * allocated.
                        */
        PMSel_SelCriteriumStruct selCriteria[],
                        /* IN: OPTIONAL
                        * List of criteria that the
                        * selected volume must satisfy.
                        *
                        * Pass NULL if no list.
                        */
        SMS_Int16 numCriteria,
                        /* IN: OPTIONAL
                        * (REQUIRED if selCriteria is
                        * specified)
                        * Number of criteria in list.
                        *
                        * Pass 0 if no list.
                        */
        void* subsetDescPtr,
                        /* IN/OUT: OPTIONAL
                        * Descriptor for the
                        * list of volumes
                        * to include/exclude.
                        * pass NULL if no subset.
                        */
        PMSel_VolIDStruct* selectedVolPtr
                        /* OUT: REQUIRED
                        * Ptr to the volume selected.
                        */
)
{
        /*
        * Define for an invalid index into the scratch array of volumes.
        */
        #define INVALID_INDEX -1
        SMS_ErrType
        rcode                   = FEOK,
        return_code             = FEOK;
        SMS_Int16
        exceptionClass          = SMS_ZERO,
        index                   = SMS_ZERO,
        numCandidates              = SMS_ZERO,
        numMaxExtents              = SMS_ZERO,
        numMinimumExtents           = SMS_ZERO,
        lVolStatsIndex          = SMS_ZERO,
        lVolInfoIndex           = SMS_ZERO,
        lastElemInScratchArray     = INVALID_INDEX,
        selectedVolIndex           = INVALID_INDEX,
```

```
fullFileMatchVolIndex              = INVALID_INDEX,
cpuAndFullFileMatchVolIndex          = INVALID_INDEX,
minExtentsMatchVolIndex            = INVALID_INDEX,
biggestExtentMatchVolIndex         = INVALID_INDEX,
prodSpaceExtMatchVolIndex            = INVALID_INDEX,
primaryCPU                     = INVALID_INDEX,
nStatusMatchIndex                = INVALID_INDEX,
nNumVolInfoIndex                = SMS_ZERO,
*panVolInfoIndex                = NULL
;
unsigned long
fullFileMatchVolTimesSelected         = ULONG_MAX,
cpuAndFullFileMatchVolTimesSelected     = ULONG_MAX,
minExtentsMatchVolTimesSelected        = ULONG_MAX,
cpuAndMinExtentsMatchVolTimesSelected    = ULONG_MAX
;
long long
julianTimeStamp
;
SMS_Int32
sizePrimaryExtent               = SMS_ZERO,
sizeSecondaryExtent             = SMS_ZERO,
requiredExtentSize              = SMS_ZERO,
XORResult                    = SMS_ZERO,
ANDResult                    = SMS_ZERO
;
SMS_Int64
sizeMinimumFile                = SMS_ZERO,
sizeEntireFile                = SMS_ZERO,
prodOfSpaceAndExtent             = SMS_ZERO,
biggestProdOfSpaceAndExtent          = SMS_ZERO;
SMS_Boolean
*considerMeArrayPtr              = NULL,
cpuCriteriaSpecifiedFlag            = SMS_FALSE,
volHasBeenSelectedFlag            = SMS_FALSE
;
SMS_ExtVolumeNameType
lVolName;
SMS_ByteStatConfigBooleanStruct
statConfigBoolesMask,
statConfigBooles;
SMS_ByteStatConfigStatesStruct
statConfigStatesMask,
statConfigStates;
PMSel_ScratchArrayEntryStruct
*scratchArrayPtr               = NULL,
*tempScratchPtr                = NULL,
saeElement
;
PMComm_VolInfoStruct
*tempvolInfoPtr                = NULL;
PMComm_VolStatsStruct
*lVolStatsPtr                 = NULL;
PMSel_SubsetDescStruct
*lsubsetDescPtr                = NULL;
SMS_DebuggingLabel ( ValidateParams );
```

```
SMS_AssertTruth(! SMSMem_MemAddrIsNull ((void *)heapToUse ));
SMS_AssertTruth(! SMSMem_MemAddrIsNull (volDescPtr ));
SMS_AssertTruth((memcmp(volDescPtr-> eyeCatcher,
            PMCOMM_VOLDESC_EYECATCHER,
            SMS_MAXEYECATCHERBYTES)) == 0);
SMS_AssertTruth(! SMSMem_MemAddrIsNull
        ((void *)(volDescPtr-> volInfoArray) ));
SMS_AssertTruth((volDescPtr-> volInfoSize) > SMS_ZERO);
/*
 * Initialize local variables.
 */
memset(&saeElement,
    SMS_ZERO,
    sizeof(saeElement)
    );
for (index = SMS_ZERO; index < numCriteria; ++index)
{
  SMS_AssertTruth((selCriteria[index].criteriumID >
           PMSEL_FIRSTSELCRITERIA_ENUM) &&
          (selCriteria[index].criteriumID <
           PMSEL_LASTSELCRITERIA_ENUM));
  switch (selCriteria[index].criteriumID)
  {
    case PMSEL_PRIMARYCPU:
    {
      cpuCriteriaSpecifiedFlag = SMS_TRUE;
      primaryCPU = *((SMS_Int16*)(selCriteria[index].val));
      break;
    }
    case PMSEL_SIZE_PRIMARY_EXTENT:
    {
      sizePrimaryExtent = *((SMS_Int32*)(selCriteria[index].val));
      break;
    }
    case PMSEL_SIZE_SECONDARY_EXTENT:
    {
      sizeSecondaryExtent = *((SMS_Int32*)(selCriteria[index].val));
      break;
    }
    case PMSEL_NUM_MAXEXTENTS:
    {
      numMaxExtents = *((SMS_Int16*)(selCriteria[index].val));
      break;
    }
    default:
    {
      /* Nothing to be done here. */
      break;
    }
  } /* switch (selCriteria[index].criteriumID) */
} /* for (index = SMS_ZERO; index < numCriteria; ++index) */
if (! SMSMem_MemAddrIsNull (subsetDescPtr))
{
  lsubsetDescPtr = (PMSel_SubsetDescStruct*)subsetDescPtr;
  SMS_AssertTruth((memcmp(lsubsetDescPtr-> eyeCatcher,
            PMSEL_SUBSETDESC_EYECATCHER,
```

```
                    SMS_MAXEYECATCHERBYTES)) == 0);
    SMS_AssertTruth(! SMSMem_MemAddrIsNull
            ((void *)(lsubsetDescPtr-> heapToUse) ));
    SMS_AssertTruth(((lsubsetDescPtr-> subsetType) ==
            PMSEL_EXCLUDESUBSET) ||
            ((lsubsetDescPtr-> subsetType) ==
            PMSEL_INCLUDESUBSET));
    SMS_AssertTruth((lsubsetDescPtr-> subsetSize) > SMS_ZERO);
}
SMS_AssertTruth(! SMSMem_MemAddrIsNull (selectedVolPtr ));
/*
 * Initialize the output parameter.
 */
memset((void*)selectedVolPtr,
    SMS_ZERO,
    (sizeof(PMSel_VolIDStruct)));
/*
 * Always consider for selection all the volumes in the volInfo array.
 */
numCandidates = volDescPtr-> volInfoSize;
SMS_DebuggingLabel ( AllocateMemoryAndInitializeIt );
/*
 * Allocate memory for a scratch array of volumes.
 */
rcode = SMSHeap_New((SMS_Addr*)&scratchArrayPtr,
        (SMS_Int32)(numCandidates *
            (sizeof(PMSel_ScratchArrayEntryStruct))),
        (SMS_Int16*)heapToUse,
        &exceptionClass);
if (rcode != FEOK)
{
  return_code = rcode;
  goto FunctionExit;
}
/*
 * Copy the scratchArrayPtr to a temporary location.
 */
tempScratchPtr = scratchArrayPtr;
/*
 * Initialize the scratch array.
 */
for (index = SMS_ZERO; index < numCandidates; ++index)
{
  memcpy(tempScratchPtr-> eyeCatcher,
        PMSEL_SCRATCHARRAYENTRY_EYECATCHER,
        SMS_MAXEYECATCHERBYTES);
  tempScratchPtr-> volInfoIndex = -1;
  tempScratchPtr-> volStatsIndex = -1;
  tempScratchPtr-> volPrimaryCpu = 0xFF;
  tempScratchPtr-> pagesFree = -1;
  tempScratchPtr-> timesSelected = 0;
  tempScratchPtr-> volCapacity_1 = -1;
  tempScratchPtr-> largestVolFragment_1 = -1;
  tempScratchPtr++;
}
SMS_DebuggingLabel ( InitializeLocalVariables );
```

A-43

```
memset((void*)&statConfigBoolesMask,
    SMS_ZERO,
    (sizeof(SMS_ByteStatConfigBooleanStruct)));
memset((void*)&statConfigBooles,
    SMS_ZERO,
    (sizeof(SMS_StatConfigBooleanStruct)));
memset((void*)&statConfigStatesMask,
    SMS_ZERO,
    (sizeof(SMS_ByteStatConfigStatesStruct)));
memset((void*)&statConfigStates,
    SMS_ZERO,
    (sizeof(SMS_StatConfigStatesStruct)));
memset((void*)&lVolName,
    SMS_ZERO,
    (sizeof(SMS_ExtVolumeNameType)));
/*
 * Allocate memory for an array of booleans that will be used to
 * filter out volumes.
 */
rcode = SMSHeap_New((SMS_Addr*)&considerMeArrayPtr,
        (SMS_Int32)((volDescPtr-> volInfoSize)
            * (sizeof(SMS_Boolean))),
        (SMS_Int16*)heapToUse,
        &exceptionClass);
if (rcode != FEOK)
{
  return_code = rcode;
  goto FunctionExit;
}
/*
 * Allocate memory for an array of SMS_Int16 that will contain the index of
 * those volumes from the volInfoArray that match the status criteria.
 */
rcode = SMSHeap_New ((SMS_Addr*)&panVolInfoIndex,
        (SMS_Int32)((volDescPtr-> volInfoSize)
            * (sizeof(SMS_Int16))),
        (SMS_Int16*)heapToUse,
        &exceptionClass
        );
if (rcode != FEOK)
{
  return_code = rcode;
  goto FunctionExit;
}
SMS_DebuggingLabel ( ProcessVolsInSubset );
/*
 * Process the volumes in the subset and set proper values for the elements
 * in considerMeArrayPtr depending on whether the volumes in the subset are
 * to be included or excluded from selection.
 */
rcode = PMSel_ProcessVolsInSubset(volDescPtr,
                lsubsetDescPtr,
                considerMeArrayPtr);
if (rcode != FEOK)
{
  return_code = rcode;
```

```
   goto FunctionExit;
}
SMS_DebuggingLabel ( TranslateSelectionCriteria );
/*
 * Translate the selection criteria into bit fields.
 */
if (numCriteria > SMS_ZERO)
{
   /*
    * Atleast one selection criteria has been specified.
    * Translate the criteria into bit fields.
    * Construct the bit masks for the selection criteria
    */
   PMSel_ConstructStatConfigInfo_v(selCriteria,
                     numCriteria,
                     &statConfigBoolesMask,
                     &statConfigBooles,
                     &statConfigStatesMask,
                     &statConfigStates);
}
SMS_DebuggingLabel ( CalculateSpaceRequirement );
/*
 * Compute the amount of free space required on the volume to be selected
 * based on the size of the primary extent.
 *
 * Compute the required extent size which is the larger of the primary and
 * secondary extent sizes.
 *
 * Compute the minimum extent size which is 16 if the desired max num extents
 * is greater than or equal to 16, and one otherwise.
 *
 * Compute the minimum file size based on the max extent size and minimum
 * number of extents.
 *
 * Cast sizeSecondaryExtent to SMS_Int64 so that a 64-bit container is used
 * for the rvalue calculation of the assignment below. Otherwise, if the
 * rvalue calculation yields a result greater than 32-bits, we may get a CPU
 * halt %5101.
 */
sizeEntireFile = (sizePrimaryExtent
            + ((SMS_Int64)sizeSecondaryExtent
               * (numMaxExtents - 1)
              )
           );
requiredExtentSize = SMS_max(sizePrimaryExtent, sizeSecondaryExtent);
numMinimumExtents = (numMaxExtents >= 16) ? 16 : 1;
sizeMinimumFile = (sizePrimaryExtent
            + ((SMS_Int64)sizeSecondaryExtent
               * (numMinimumExtents - 1)
              )
           );
SMS_DebuggingLabel ( ApplySelectionCriteriaToVolsInPool );
/*
 * Apply the selection criteria to each volume in the pool. Doing this will
 * get us a smaller set of volumes from which we can finally select one.
 */
```

A-45

```
for (index = SMS_ZERO;
     index < (volDescPtr-> volInfoSize);
     ++index)
{
  if (considerMeArrayPtr[index] != SMS_TRUE)
  {
    /*
     * Means that this volume is in the exclude subset and should not be
     * considered for selection. Check the next volume.
     */
    continue;
  }
  /*
   * Means that we need to consider this volume for inclusion in the set
   * of selectable volumes.
   * Check whether this volume matches the selection criteria.
   */
  tempvolInfoPtr = &(((PMComm_VolInfoStruct*)(volDescPtr->
                                volInfoArray))[index]);
  /*
   * Exclusive OR the selection criteria bit fields with the bit fields
   * of the selected volume's config booleans.
   * AND the result of the above operation with the mask created
   * previously.
   */
  XORResult = (statConfigBooles.configStatBoolLong ^
              (tempvolInfoPtr-> statConfigBooles).configStatBoolLong);
  ANDResult = XORResult & statConfigBoolesMask.configStatBoolLong;
  if (ANDResult != SMS_ZERO)
  {
    /*
     * If ANDResult is not zero, it means that the volume does not have the
     * necessary status and configuration boolean values.
     * Check the next volume.
     */
    continue;
  }
  /*
   * The volume has the necessary status and configuration boolean values.
   * Proceed to check the config states.
   */
  XORResult = (statConfigStates.configStatesLong ^
              (tempvolInfoPtr-> statConfigStates).configStatesLong);
  ANDResult = XORResult & statConfigStatesMask.configStatesLong;
  if (ANDResult != SMS_ZERO)
  {
    /*
     * The volume does not have the necessary status and configuration
     * states.
     * Check the next volume.
     */
    continue;
  }
  /*
   * It means that the volume also has the necessary status and
   * configuration states.
```

A-46

```
 * Check whether an PMSEL_INCLUDESUBSET has been specified. If yes, it
 * means that the volume in the subset was specified as part of a PHYSVOL
 * option. When PHYSVOL is specified, it is sufficient to do just the
 * status check for that volume. The reasoning is that if the user wishes
 * to explicitly specify the volume on which to place the file, the
 * selection algorithm should not reject that volume on account of a
 * statistics mismatch. The original algorithm design allows the user to
 * specify more than one volume in the include subset. However, the
 * external interfaces to the VDP allow only one volume to be specified
 * with the PHYSVOL option. So, before we skip the statistics test and
 * select the volume on the basis of status success alone, we will do a
 * little sanity check to ensure that the subset contains only one
 * volume. If not, it means that the interface has been modified to accept
 * more than one volume in the subset, which in turn means that we have to
 * also do the statistics matching before selecting the appropriate
 * volume.
 */
if ((! SMSMem_MemAddrIsNull (lsubsetDescPtr))
    &&
    (PMSEL_INCLUDESUBSET == lsubsetDescPtr-> subsetType)
    &&
    (1 == lsubsetDescPtr-> subsetSize)
   )
{
   /*
    * PHYSVOL has been specified. Return this volume to the caller.
    */
   memcpy(&(selectedVolPtr-> volName),
          &(tempvolInfoPtr-> volName),
          (strlen((char*)&(tempvolInfoPtr-> volName))));
   selectedVolPtr-> volID = index;
   goto FunctionExit;
}
/*
 * This volume satisfies the status criteria. Save its index in the
 * panVolInfoIndex array.
 */
panVolInfoIndex[nNumVolInfoIndex] = index;
nNumVolInfoIndex++;
/*
 * Compute a statsVal for the volume and add the entry to the
 * scratch table.
 */
memcpy(saeElement.eyeCatcher,
       PMSEL_SCRATCHARRAYENTRY_EYECATCHER,
       SMS_MAXEYECATCHERBYTES);
saeElement.volInfoIndex = index;
strcpy((char*)&lVolName,
       (char*)&(tempvolInfoPtr-> volName));
SMS_DebuggingLabel ( ComputeStatsValForVolume );
/*
 * Compute statsVal for the volume and fill in the statistics field of
 * saeElement.
 */
PMSel_ComputeStatsVal_v(volDescPtr,
            &lVolName,
```

A-47

```
                &saeElement
                );
/*
 * We should consider a volume for selection only if its statistics are
 * available and its largest extent is big enough to accommodate at least
 * the primary extent of the file being created.
 */
if (saeElement.largestVolFragment_l < sizePrimaryExtent)
{
  /*
   * This volume does not have the required free space.
   */
  continue;
}
/*
 * If the CPU selection criteria is specified, set up the field in
 * saeElement.
 */
if (cpuCriteriaSpecifiedFlag)
{
  /*
   * The CPU information is stored in the last 4 bits. We need to
   * mask off the first 4 bits so that selectionCPU contains only
   * the CPU information.
   */
  saeElement.volPrimaryCpu = (SMS_Byte)(tempvolInfoPtr-> primaryCPU
                        & 0x0F);
} /* if (cpuCriteriaSpecifiedFlag) */
SMS_DebuggingLabel ( AddVolumeToScratchArray );
/*
 * Add volume to the scratch array.
 */
rcode = PMSel_AddEntryToScratchArray(&saeElement,
                        scratchArrayPtr,
                        numCandidates,
                        &lastElemInScratchArray
                        );
if (rcode != FEOK)
{
  return_code = rcode;
  goto FunctionExit;
}
memset(&saeElement,
    SMS_ZERO,
    sizeof(saeElement)
    );
} /* for (index = SMS_ZERO;
 *      index < (volDescPtr-> volInfoSize);
 *      ++index)
 */
/*
 * Check whether we have atleast one volume that satisfies the status
 * criteria. If not, it means that we haven't been able to select any
 * volume. Return an error to the caller.
 */
if (SMS_ZERO == nNumVolInfoIndex)
```

```
{
  return_code = FESMSNOPHYSVOLSAVAIL;
  goto FunctionExit;
}
SMS_DebuggingLabel ( SelectVolumeFromScratchArray );
for (index = SMS_ZERO; index <= lastElemInScratchArray; index++)
{
  /*
   * Note that in this selection process, the variable selectedVolIndex
   * represents the chosen volume. We are mainly selecting volumes based on
   * three criteria; capacity to accomodate the entire file, capacity to
   * accomodate the file based on some value of minimum extents, and largest
   * product of free space and extent size, in that order. The selection
   * process is ordered such that if a volume matches a higher order
   * criterium, then the checks for the lower order criteria will be skipped
   * for all subsequent volumes in the scratch array. Also, whenever we
   * cannot find any volumes that have the capacity to accommodate the
   * entire file, the volumes satisfying the LRU (Least Recently Used)
   * criterium have greater priority than volumes satisfying the CPU
   * criterium.
   */
  tempScratchPtr = &(scratchArrayPtr[index]);
  /*
   * Check whether or not the volume has enough space to accommodate the
   * entire file and that its largest extent is greater than or equal to the
   * size of the larger of the file's primary and secondary extent.
   */
  if ((tempScratchPtr-> largestVolFragment_l >= requiredExtentSize) &&
     ((SMS_Int64)(tempScratchPtr-> pagesFree) >= sizeEntireFile)
     )
  {
    /*
     * Among volumes that match the above criteria, check whether this
     * volume has been selected the least number of times.
     */
    if (tempScratchPtr-> timesSelected < fullFileMatchVolTimesSelected)
    {
      selectedVolIndex = index;
      fullFileMatchVolIndex = index;
      fullFileMatchVolTimesSelected = tempScratchPtr-> timesSelected;
      volHasBeenSelectedFlag = SMS_TRUE;
    } /*
       * if (tempScratchPtr-> timesSelected <
       *     fullFileMatchVolTimesSelected
       *   )
       */
    /*
     * Check whether this volume matches the cpu criteria if one has
     * been specified.
     */
    if ((cpuCriteriaSpecifiedFlag) &&
       (primaryCPU == tempScratchPtr-> volPrimaryCpu)
       )
    {
      if (tempScratchPtr-> timesSelected <
         cpuAndFullFileMatchVolTimesSelected
```

A-49

```
      )
      {
        cpuAndFullFileMatchVolIndex = index;
        cpuAndFullFileMatchVolTimesSelected =
        tempScratchPtr-> timesSelected;
      }
    }
    /*
    * Found a volume matching the full file criteria. Check the next
    * volume in the scratch array for a possible better volume.
    */
    continue;
  } /*
    * if ((tempScratchPtr-> largestVolFragment_l >= requiredExtentSize) &&
    *    ((SMS_Int64)(tempScratchPtr-> pagesFree) >= sizeEntireFile)
    *  )
    */
  /*
  * Check whether or not the volume has met the previous criteria. If not,
  * check whether or not it can accommodate the file with a minimum number
  * of extents.
  */
  if ((INVALID_INDEX == fullFileMatchVolIndex) &&
      (tempScratchPtr-> largestVolFragment_l >= requiredExtentSize) &&
      ((SMS_Int64)(tempScratchPtr-> pagesFree) >= sizeMinimumFile)
     )
  {
    /*
    * Among volumes that match the above criteria, check whether this
    * volume has been selected the least number of times.
    */
    if (tempScratchPtr-> timesSelected < minExtentsMatchVolTimesSelected)
    {
      selectedVolIndex = index;
      minExtentsMatchVolIndex = index;
      minExtentsMatchVolTimesSelected = tempScratchPtr-> timesSelected;
      volHasBeenSelectedFlag = SMS_TRUE;
    } /*
      * if (tempScratchPtr-> timesSelected <
      *     cpuAndMinExtentsMatchVolTimesSelected
      *   )
      */
    /*
    * Check whether this volume matches the cpu criteria if one has
    * been specified.
    */
    if ((cpuCriteriaSpecifiedFlag) &&
        (primaryCPU == tempScratchPtr-> volPrimaryCpu)
       )
    {
      if (tempScratchPtr-> timesSelected <
          cpuAndMinExtentsMatchVolTimesSelected
         )
      {
        selectedVolIndex = index;
        cpuAndMinExtentsMatchVolTimesSelected =
```

```
            tempScratchPtr-> timesSelected;
        }
    }
    /*
     * Found a volume matching the minimum extents criteria. Check the next
     * volume in the scratch array for a possible better volume.
     */
    continue;
} /*
   * if ((INVALID_INDEX == fullFileMatchVolIndex) &&
   *    (tempScratchPtr-> largestVolFragment_l >= requiredExtentSize) &&
   *    ((SMS_Int64)(tempScratchPtr-> pagesFree) >= sizeMinimumFile)
   *    )
   */
/*
 * Check whether or not the volume has met the previous two criteria. If
 * not, choose a volume that has the biggest extent from amongst all
 * volumes whose largest extent is greater than or equal to
 * requiredExtentSize.
 */
if ((INVALID_INDEX == fullFileMatchVolIndex) &&
    (INVALID_INDEX == minExtentsMatchVolIndex) &&
    (tempScratchPtr-> largestVolFragment_l >= requiredExtentSize)
   )
{
    selectedVolIndex = index;
    biggestExtentMatchVolIndex = index;
    volHasBeenSelectedFlag = SMS_TRUE;
    /*
     * Check the next volume in the scratch array.
     */
    continue;
}
/*
 * Check whether or not the volume has met the previous three criteria. If
 * not, choose a volume that has the largest product of free space and
 * biggest extent.
 */
if ((INVALID_INDEX == fullFileMatchVolIndex) &&
    (INVALID_INDEX == minExtentsMatchVolIndex) &&
    (INVALID_INDEX == biggestExtentMatchVolIndex)
   )
{
    /*
     * Calculate the product of free space and biggest extent for this
     * volume.
     */
    prodOfSpaceAndExtent =
    (
     (SMS_Int64)(tempScratchPtr-> pagesFree)
     * (SMS_Int64)(tempScratchPtr-> largestVolFragment_l)
    );
    if (prodOfSpaceAndExtent > biggestProdOfSpaceAndExtent)
    {
        /*
         * Select this volume.
```

```
          */
          selectedVolIndex = index;
          prodSpaceExtMatchVolIndex = index;
          biggestProdOfSpaceAndExtent = prodOfSpaceAndExtent;
          volHasBeenSelectedFlag = SMS_TRUE;
          /*
           * Check the next volume in the scratch array.
           */
          continue;
        }
      }
    } /* for (index = SMS_ZERO; index <= lastElemInScratchArray; index++) */
    /*
     * When we reach here, we have either selected a volume that matches the
     * status and statistics criteria or an array of indices panVolInfoIndex of
     * volumes that have satisfied the status criteria alone. If it is the
     * latter, select a volume at random and return it to the caller. Otherwise,
     * update the statistics for the chosen volume and return that volume to the
     * caller. We have already ensured that atleast one volume matches the status
     * criteria.
     */
    if (volHasBeenSelectedFlag != SMS_TRUE)
    {
      /*
       * Select a random element from the panVolInfoIndex array.
       */
#ifdef __TANDEM
      julianTimeStamp = JULIANTIMESTAMP();
#endif
      nStatusMatchIndex = (SMS_Int16)(julianTimeStamp % nNumVolInfoIndex);
      SMS_PermAssertTruth_StopProcess(INVALID_INDEX != nStatusMatchIndex);
      tempvolInfoPtr = &(((PMComm_VolInfoStruct*)
                  (volDescPtr-> volInfoArray))[nStatusMatchIndex]);
      memcpy(&(selectedVolPtr-> volName),
          &(tempvolInfoPtr-> volName),
          (strlen((char*)&(tempvolInfoPtr-> volName))));
      selectedVolPtr-> volID = index;
      goto FunctionExit;
    }
    /*
     * If we have a volume that can accommodate the entire file and matches the
     * cpu criterium, we should select it.
     */
    if (INVALID_INDEX != cpuAndFullFileMatchVolIndex)
    {
      selectedVolIndex = cpuAndFullFileMatchVolIndex;
    }
    /*
     * Record the selection and update the statistics.
     * Note that the statistics for the selected volume will always be available
     * since we already discarded volumes without statistics. Also, remember that
     * the variable 'selectedVolIndex' is the index of an element in the
     * scratchArrayPtr that contains indexes to elements in the volInfoArray and
     * volStatsArray of the volDescPtr. The scratchArrayPtr contains a list of
     * volumes that satisfy the selection criteria.
     *
```

```
*    volDescPtr            scratchArrayPtr
*        |                      |
*        |                      |
*     -- volInfoArray         -- volInfoIndex
*        |                      |
*        |                      |
*     -- volStatsArray        -- volStatsIndex
*
*/
tempScratchPtr = &(scratchArrayPtr[selectedVolIndex]);
if (! SMSMem_MemAddrIsNull ((void *)(volDescPtr-> volStatsArray )))
{
  lVolStatsIndex = tempScratchPtr-> volStatsIndex;
  lVolStatsPtr = &(((PMComm_VolStatsStruct*)
             (volDescPtr-> volStatsArray))[lVolStatsIndex]);
  if (lVolStatsPtr-> timesSelected
      >
      (ULONG_MAX - (unsigned long)(volDescPtr-> volStatsSize))
     )
  {
    /*
     * Avoid a rollover. This volume's timesSelected will remain at
     * ULONG_MAX until the next statistics is obtained. Mathematically, if
     * the pool contains about 100 volumes, this volume would have to be
     * selected about 357 million times before the timesSelected hits the
     * max value.
     */
    lVolStatsPtr-> timesSelected = ULONG_MAX;
  }
  else
  {
    /*
     * The increment size is equal to the number of volumes in the
     * volStatsArray.
     */
    lVolStatsPtr-> timesSelected +=
       (unsigned long)(volDescPtr-> volStatsSize);
  }
  (lVolStatsPtr-> pagesFree) -= sizePrimaryExtent;
}
/*
 * Set the output parameter to the selected volume.
 */
lVolInfoIndex = tempScratchPtr-> volInfoIndex;
tempvolInfoPtr = &(((PMComm_VolInfoStruct*)
            (volDescPtr-> volInfoArray))[lVolInfoIndex]);
memcpy(&(selectedVolPtr-> volName),
      &(tempvolInfoPtr-> volName),
      (strlen((char*)&(tempvolInfoPtr-> volName))));
selectedVolPtr-> volID = lVolInfoIndex;
SMS_DebuggingLabel ( FunctionExit );
/*
 * Free any memory that was allocated and return to the caller.
 */
if (! SMSMem_MemAddrIsNull (scratchArrayPtr ))
{
```

```
        /*
         * Free the memory allocated for the scratch array.
         */
        rcode = SMSHeap_Dispose((SMS_Addr*)scratchArrayPtr,
                    (SMS_Int32)(numCandidates *
                            (sizeof
                                (PMSel_ScratchArrayEntryStruct))),
                    (SMS_Int16*)heapToUse,
                    &exceptionClass);
        SMS_AssertTruth(rcode == FEOK);
    }
    if (! SMSMem_MemAddrIsNull (considerMeArrayPtr ))
    {
        /*
         * Free the memory allocated for the considerMeArrayPtr.
         */
        rcode = SMSHeap_Dispose((SMS_Addr*)considerMeArrayPtr,
                    (SMS_Int32)((volDescPtr-> volInfoSize)
                            * (sizeof(SMS_Boolean))
                        ),
                    (SMS_Int16*)heapToUse,
                    &exceptionClass);
        SMS_AssertTruth(rcode == FEOK);
    }
    if (! SMSMem_MemAddrIsNull (panVolInfoIndex ))
    {
        /*
         * Free the memory allocated for the considerMeArrayPtr.
         */
        rcode = SMSHeap_Dispose
        (
            (SMS_Addr*)panVolInfoIndex,
            (SMS_Int32)((volDescPtr-> volInfoSize) * (sizeof(SMS_Int16))),
            (SMS_Int16*)heapToUse,
            &exceptionClass
        );
        SMS_AssertTruth(rcode == FEOK);
    }
    return(return_code);
#pragma nowarn(93)
} /* PMSel_SelectVol() */
#pragma warn(93)
```

What is claimed is:

1. A method for selecting a storage volume from a plurality of storage volumes in order to create a file thereon, comprising:
   maintaining for each of the storage volumes values indicative of,
      free storage space,
      number of storage fragments and size of each fragment, and
      a use value reflecting the number of times such storage volume has been used for file creation;
   providing, for the file, attribute information that includes a size for each of a primary extent and a secondary extent, and a number of maximum extents;
   forming a list of the plurality of storage volumes having at least one storage fragment with a size matching the larger of the primary extent or the secondary extent of the file; and
   selecting a storage volume from the list of the plurality of storage volumes having the smallest use value.

2. The method of claim 3, wherein N is a number of the plurality of storage volumes, and wherein the method further comprises incrementing the use value by N.

3. The method of claim 1, further comprising randomly generating the use value for each of the plurality of storage volumes.

4. A method for placing a file in a system with a plurality of storage volumes, comprising:
   instantiating a process that obtains information on each of the plurality of storage volumes; and
   responding to a request accompanied by criteria for placing the file, the response including
      determining if any of the plurality of storage volumes is suitable in that it can accommodate the file in its entirety and/or for which the obtained information substantially matches the criteria, and
      selecting a storage volume, wherein if any of the plurality of storage volumes is determined to be suitable the selected storage volume is one of the suitable storage volumes that has been selected for file creation the least number of times, and
      forwarding the request for placing the file to a process associated with the selected storage volume.

5. The method of claim 4, wherein the instantiated process periodically polls each of the plurality of storage volumes in order to obtain the information therefrom, the obtained information for each storage volume includes its available space, number and size of extents and number and size of fragments.

6. The method of claim 4, wherein the criteria includes primary and secondary extent values and a maximum number of extents the file will use.

7. The method of claim 4, further comprising:
   assigning to each of the plurality of storage volumes a times selected value.

8. The method of claim 7, wherein N is a number of the plurality of storage volumes, and wherein the times selected values are numbers between 1 and N each of which being randomly assigned to one of the N storage volumes.

9. The method of claim 8, wherein if any of the plurality of storage volumes is determined to be suitable the times selected value assigned to the selected storage volume is incremented by N.

10. The method of claim 6, wherein if none of the plurality of storage volumes can accommodate the file in its entirety and has a fragment sufficiently large to fit the larger of the primary and secondary extents, the determination further includes determining if any of the plurality of storage volumes has a fragment sufficiently large to fit the larger of the primary and secondary extents and a predetermined minimum number of extents or, alternatively, in order to minimally accommodate the file, searching for any storage volume with which a largest product of its largest fragment and its available space is associated.

11. The method of claim 4, wherein if no storage volume can be found which is suitable a storage volume is selected from a list.

12. The method of claim 4, wherein if the selected storage volume cannot accommodate the file when first written an error is returned to a user that initiated the request.

13. The method of claim 4, wherein the instantiated process creates a list of storage volumes.

14. The method of claim 4, wherein the obtained information includes status information for each storage volume, wherein the criteria indicates desired status.

15. The method of claim 5, wherein upon obtaining the information, data reflecting the available space is refreshed.

16. A method for placing a file in a system with a plurality of storage volumes, comprising:
   instantiating a process that obtains information on each of the plurality of storage volumes; and
   responding to a request accompanied by status and statistics for placing the file, the response including
      creating a list of storage volumes for which the obtained information includes status information that matches the status in the request;
      determining if any of the storage volumes in the list is suitable in that it can accommodate the file in its entirety and/or for which the obtained information substantially matches the statistics, and
      nominating a storage volume from the list, wherein if any of the plurality of storage volumes is determined to be suitable the nominated storage volume is one of the suitable storage volumes that has been nominated for file creation the least number of times, and
      forwarding the request for placing the file to a process associated with the nominated storage volume.

17. The method of claim 16, wherein the instantiated process periodically polls each of the plurality of storage volumes in order to obtain the information therefrom, the obtained information for each storage volume includes its available space, number and size of extents and number and size of fragments.

18. The method of claim 16, wherein the statistics include primary and secondary extent values and a maximum number of extents the file will use.

19. The method of claim 16, further comprising:
   assigning to each of the plurality of storage volumes a times selected value.

20. The method of claim 19, wherein N is a number of the plurality of storage volumes, and wherein the times selected values are numbers between 1 and N each of which being randomly assigned to one of the N storage volumes.

21. The method of claim 20, wherein if any of the plurality of storage volumes is determined to be suitable the times selected value assigned to the selected storage volume is incremented by N.

22. The method of claim 6, wherein if none of the plurality of storage volumes can accommodate the file in its entirety and has a fragment sufficiently large to fit the larger of the primary and secondary extents, the determination further includes determining if any of the plurality of storage volumes has a fragment sufficiently large to fit the larger of the primary and secondary extents and a predetermined minimum number of extents or, alternatively, in order to minimally accommodate the file, searching for any storage volume with which a largest product of its largest fragment and its available space is associated.

23. The method of claim 16, wherein if the nominated storage volume cannot accommodate the file when first written an error is returned to a user that initiated the request.

24. The method of claim 17, wherein upon obtaining the information, data reflecting the available space is refreshed.

25. A system for placing a file, the system comprising a plurality of storage volumes and further comprising:
   means for instantiating a process that obtains information on each of the plurality of storage volumes; and
   means for responding to a request accompanied by criteria for placing the file, the response means including
      means for determining if any of the plurality of storage volumes is suitable in that it can accommodate the file in its entirety and/or for which the obtained information substantially matches the criteria, and
      means for selecting a storage volume, wherein if any of the plurality of storage volumes is determined to be suitable the selected storage volume is one of the suitable storage volumes that has been selected for file creation the least number of times, and
      means for forwarding the request for placing the file to a process associated with the selected storage volume.

26. A system for placing a file, the system comprising a plurality of storage volumes and further comprising:
   means for instantiating a process that obtains information on each of the plurality of storage volumes; and
   means for responding to a request accompanied by status and statistics for placing the file, the response means including
      means for creating a list of storage volumes for which the obtained information includes status information that matches the status in the request;
      means for determining if any of the storage volumes in the list is suitable in that it can accommodate the file in its entirety and/or for which the obtained information substantially matches the statistics, and
      means for nominating a storage volume from the list, wherein if any of the plurality of storage volumes is determined to be suitable the nominated storage volume is one of the suitable storage volumes that has been nominated for file creation the least number of times, and
      means for forwarding the request for placing the file to a process associated with the nominated storage volume.

27. A system for placing a file, the system running an application that requests the file placement, the system comprising a plurality of storage volumes and further comprising:
   a storage management facility configured to run a virtual process for each of the plurality of storage volumes and to receive from the application the file placement request which is accompanied by attributes including status and statistics;
   a pool process facility having communicative access to the plurality of storage volumes and the storage management facility, the pool process being configured to obtain information from each of the storage volumes and to provide such information correspondingly to the virtual processes; and
   a file placement manager facility having communicative access to the store management facility and receiving therefrom the file placement request, the file placement manager facility being responsive to the file placement request by
      creating a list of storage volumes for which the obtained information includes status information that matches the status in the request;
      determining if any of the storage volumes in the list is suitable in that it can accommodate the file in its entirety and/or for which the obtained information substantially matches the statistics, and
      nominating a storage volume from the list, wherein if any of the plurality of storage volumes is determined to be suitable the nominated storage volume is one of the suitable storage volumes that has been nominated for file creation the least number of times, and
      forwarding the request for placing the file to a process associated with the nominated storage volume.

28. The system of claim 27, wherein the pool process is further configured to periodically poll the storage volumes for the information.

29. The system of claim 26, wherein the storage management facility, pool process facility and file placement manager facility use one or a cluster of processors.

30. A method for placing a file in a system with a plurality of storage volumes, comprising:
   selecting from the plurality of storage volumes a subset of candidate storage volumes to be considered and filtering out others of the plurality of storage volumes from the subset;
   translating selection criteria into a set of bit fields, wherein a corresponding set of bit fields is provided with each of the plurality of storage volumes, and for each candidate storage volume
      providing a bit field mask that indicates which bits of the bit field should be matched in a comparison;
      applying the translated selection criteria to each of the candidate storage volumes under consideration by performing a bit-wise Exclusive OR (XOR) between the selection criteria bit field and the volume's corresponding set of bit fields to create a XOR result indicating the bits in which they differ;
   performing a bit-wise AND between the XOR result and the bit field mask to determine which differences are important;
   determining if the candidate storage volume can accommodate a primary extent of the file and if so noting it in a scratch array; and
   scanning the scratch array to find a storage volume based on selection factors.

31. The method of claim 30, wherein the scanning includes, for each storage volume noted in the scratch array, determining whether the noted storage volume has enough space to accommodate the file in its entirety and whether its largest extent is greater than or equal to a size of the larger of primary and secondary extents, and if so nominating the storage volume, and if not determining whether that noted storage volume can accommodate the file with a minimum number of extents, and if so nominating that storage volume, and if not nominating a noted storage volume that has the biggest extent from amongst all the noted storage volumes whose largest extent is greater than or equal to a required extent size, and if not, nominating a noted storage volume for which a product of its free space and biggest extent is largest, and wherein the scanning further includes determining whether among the noted storage volumes that match the selection factors, the nominated noted storage volume has been selected least number of times.

32. The method of claim 30, wherein the candidate storage volumes include non-isolated, non-quarantined storage volumes that are in an up state.

33. The method of claim 32, wherein a caller has the capacity to override the selection of the non-isolated, non-quarantined storage volumes that are in the up state.

* * * * *